US008660427B2

(12) United States Patent
Ovadia

(10) Patent No.: US 8,660,427 B2
(45) Date of Patent: Feb. 25, 2014

(54) METHOD AND APPARATUS OF THE ARCHITECTURE AND OPERATION OF CONTROL PROCESSING UNIT IN WAVELENGHT-DIVISION-MULTIPLEXED PHOTONIC BURST-SWITCHED NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 2619 days.

(21) Appl. No.: 10/242,839

(22) Filed: Sep. 13, 2002

(65) Prior Publication Data
US 2004/0052525 A1 Mar. 18, 2004

(51) Int. Cl.
*H04J 14/00* (2006.01)
*H04B 10/00* (2013.01)

(52) U.S. Cl.
USPC .................. 398/47; 398/52; 398/54; 398/57; 398/58; 398/66

(58) Field of Classification Search
USPC .................................. 398/47–58, 66, 75, 98
See application file for complete search history.

(56) References Cited

U.S. PATENT DOCUMENTS

| | | | |
|---|---|---|---|
| 3,632,882 A * | 1/1972 | Ciecierski et al. | ............ 370/472 |
| 4,663,748 A | 5/1987 | Karbowiak et al. | |
| 5,235,592 A | 8/1993 | Cheng et al. | |
| 5,331,642 A | 7/1994 | Valley et al. | |
| 5,457,556 A * | 10/1995 | Shiragaki | .................. 398/50 |
| 5,506,712 A | 4/1996 | Sasayama et al. | |
| 5,550,803 A | 8/1996 | Crayford et al. | |
| 5,559,796 A | 9/1996 | Edem et al. | |
| 5,646,943 A | 7/1997 | Elwalid | |
| 5,768,274 A | 6/1998 | Murakami et al. | |
| 5,838,663 A | 11/1998 | Elwalid et al. | |
| 5,970,050 A | 10/1999 | Johnson | |

(Continued)

FOREIGN PATENT DOCUMENTS

| | | |
|---|---|---|
| CN | 1384618 A | 12/2002 |
| CN | 1406000 A | 3/2003 |

(Continued)

OTHER PUBLICATIONS

Jacob and Kumar. "Delay Performance of Some Scheduling Strategies in an Input Queuing ATM Switch with Multiclass Bursty Traffic." IEEE / ACM transactions on networking. vol. 4 No. 2, Apr. 1996. pp. 258-271.*

(Continued)

*Primary Examiner* — Ken Vanderpuye
*Assistant Examiner* — Abbas H Alagheband
(74) *Attorney, Agent, or Firm* — Cool Patent, P.C.

(57) ABSTRACT

A method and apparatus for control and data burst routing in WDM photonic burst-switched network is disclosed. In one embodiment, only the control bursts and network management labels are going through optical-electrical-optical conversion inside the photonic burst switching (PBS) module. The building blocks of the control processing unit inside the PBS module may include input and output buffers, control burst parser, burst scheduler, PBS configuration and control, contention resolution, forwarding engine, network management controller, control burst generator, and queue manager. The contention resolution block may be used to resolve resource contention between multiple data bursts. Such contention resolution may take the form of adding additional delays to one of the data bursts, changing one of the data bursts to an alternate wavelength, or dropping some of the data bursts based on various criteria such as relative priority and wavelength.

37 Claims, 16 Drawing Sheets

(56) References Cited

U.S. PATENT DOCUMENTS

| | | | |
|---|---|---|---|
| 5,978,356 A | 11/1999 | Elwalid et al. | |
| 6,111,673 A | 8/2000 | Chang et al. | |
| 6,222,839 B1 | 4/2001 | Nakazaki et al. | |
| 6,260,155 B1 | 7/2001 | Dellacona | |
| 6,271,946 B1 | 8/2001 | Chang et al. | |
| 6,272,117 B1 | 8/2001 | Choi et al. | |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,466,586 B1 | 10/2002 | Darveau et al. | |
| 6,487,686 B1 | 11/2002 | Yamazaki et al. | |
| 6,490,292 B1 | 12/2002 | Matsuzawa | |
| 6,498,667 B1 | 12/2002 | Masucci et al. | |
| 6,519,062 B1* | 2/2003 | Yoo | 398/49 |
| 6,519,255 B1 | 2/2003 | Graves | |
| 6,525,850 B1 | 2/2003 | Chang et al. | |
| 6,542,499 B1 | 4/2003 | Murphy et al. | |
| 6,545,781 B1 | 4/2003 | Chang et al. | |
| 6,603,893 B1 | 8/2003 | Liu et al. | |
| 6,615,382 B1 | 9/2003 | Kang et al. | |
| 6,665,495 B1 | 12/2003 | Miles et al. | |
| 6,671,256 B1 | 12/2003 | Xiong et al. | |
| 6,674,558 B1 | 1/2004 | Chang et al. | |
| 6,690,036 B2 | 2/2004 | Morse et al. | |
| 6,697,374 B1* | 2/2004 | Shraga et al. | 370/458 |
| 6,721,271 B1 | 4/2004 | Beshai et al. | |
| 6,721,315 B1* | 4/2004 | Xiong et al. | 370/389 |
| 6,839,322 B1 | 1/2005 | Smith | |
| 6,842,424 B1 | 1/2005 | Key et al. | |
| 6,873,797 B2 | 3/2005 | Chang et al. | |
| 6,898,205 B1 | 5/2005 | Chaskar et al. | |
| 6,925,257 B2 | 8/2005 | Yoo | |
| 6,940,863 B2 | 9/2005 | Xue et al. | |
| 6,956,868 B2* | 10/2005 | Qiao | 370/466 |
| 6,987,770 B1 | 1/2006 | Yonge, III | |
| 6,990,071 B2 | 1/2006 | Adam et al. | |
| 7,023,846 B1 | 4/2006 | Andersson et al. | |
| 7,035,537 B2 | 4/2006 | Wang et al. | |
| 7,092,633 B2 | 8/2006 | Fumagalli et al. | |
| 7,106,968 B2 | 9/2006 | Lahav et al. | |
| 2002/0018263 A1 | 2/2002 | Ge et al. | |
| 2002/0018468 A1 | 2/2002 | Nishihara | |
| 2002/0023249 A1 | 2/2002 | Temullo et al. | |
| 2002/0024700 A1* | 2/2002 | Yokoyama et al. | 359/135 |
| 2002/0027686 A1 | 3/2002 | Wada et al. | |
| 2002/0063924 A1 | 5/2002 | Kimbrough et al. | |
| 2002/0109878 A1 | 8/2002 | Qiao | |
| 2002/0118419 A1* | 8/2002 | Zheng et al. | 359/139 |
| 2002/0126337 A1 | 9/2002 | Uematsu et al. | |
| 2002/0141400 A1 | 10/2002 | DeMartino | |
| 2002/0150099 A1 | 10/2002 | Pung et al. | |
| 2002/0154360 A1 | 10/2002 | Liu | |
| 2002/0159114 A1 | 10/2002 | Saharabuddhe et al. | |
| 2002/0186433 A1 | 12/2002 | Mishra | |
| 2002/0186695 A1 | 12/2002 | Schwartz et al. | |
| 2002/0196808 A1 | 12/2002 | Karri et al. | |
| 2003/0002499 A1 | 1/2003 | Cummings et al. | |
| 2003/0009582 A1 | 1/2003 | Qiao et al. | |
| 2003/0016411 A1 | 1/2003 | Zhou et al. | |
| 2003/0031198 A1 | 2/2003 | Currivan et al. | |
| 2003/0037297 A1 | 2/2003 | Araki | |
| 2003/0039007 A1 | 2/2003 | Ramadas et al. | |
| 2003/0043430 A1* | 3/2003 | Handelman | 359/128 |
| 2003/0048506 A1 | 3/2003 | Handelman | |
| 2003/0053475 A1 | 3/2003 | Veeraraghavan et al. | |
| 2003/0067880 A1 | 4/2003 | Chiruvolu | |
| 2003/0099243 A1 | 5/2003 | Oh et al. | |
| 2003/0120799 A1 | 6/2003 | Lahav et al. | |
| 2003/0189933 A1 | 10/2003 | Ozugur et al. | |
| 2003/0198471 A1 | 10/2003 | Ovadia | |
| 2003/0214979 A1 | 11/2003 | Kang et al. | |
| 2004/0004966 A1 | 1/2004 | Foster et al. | |
| 2004/0062263 A1 | 4/2004 | Charcranoon et al. | |
| 2004/0120261 A1 | 6/2004 | Ovadia et al. | |
| 2004/0131061 A1 | 7/2004 | Matsuoka et al. | |
| 2004/0156325 A1 | 8/2004 | Perkins et al. | |
| 2004/0156390 A1 | 8/2004 | Prasad et al. | |
| 2004/0170165 A1 | 9/2004 | Maciocco et al. | |
| 2004/0170431 A1 | 9/2004 | Maciocco et al. | |
| 2004/0208171 A1 | 10/2004 | Ovadia et al. | |
| 2004/0208172 A1 | 10/2004 | Ovadia et al. | |
| 2004/0208544 A1 | 10/2004 | Ovadia | |
| 2004/0208554 A1 | 10/2004 | Wakai et al. | |
| 2004/0234263 A1 | 11/2004 | Ovadia et al. | |
| 2004/0252995 A1 | 12/2004 | Ovadia et al. | |
| 2004/0258407 A1 | 12/2004 | Maciocco et al. | |
| 2004/0264960 A1 | 12/2004 | Maciocco et al. | |
| 2005/0030951 A1 | 2/2005 | Maciocco et al. | |
| 2005/0063701 A1 | 3/2005 | Ovadia et al. | |
| 2005/0068968 A1 | 3/2005 | Ovadia et al. | |
| 2005/0068995 A1 | 3/2005 | Lahav et al. | |
| 2005/0089327 A1 | 4/2005 | Ovadia et al. | |
| 2005/0105905 A1 | 5/2005 | Ovadia et al. | |
| 2005/0152349 A1 | 7/2005 | Takeuchi et al. | |
| 2005/0175183 A1 | 8/2005 | Ovadia et al. | |
| 2005/0175341 A1 | 8/2005 | Ovadia | |
| 2005/0177749 A1 | 8/2005 | Ovadia | |
| 2005/0259571 A1 | 11/2005 | Battou | |
| 2006/0008273 A1 | 1/2006 | Xue et al. | |

FOREIGN PATENT DOCUMENTS

| | | |
|---|---|---|
| CN | 1426189 | 6/2003 |
| EP | 0 876 076 A2 | 11/1998 |
| EP | 1073306 A2 | 1/2001 |
| EP | 1073307 A2 | 1/2001 |
| EP | 1089498 A2 | 4/2001 |
| EP | 1122971 A2 | 8/2001 |
| EP | 1 135 000 A1 | 9/2001 |
| EP | 1217862 | 6/2002 |
| EP | 1 303 111 A2 | 4/2003 |
| EP | 1351458 A1 | 10/2003 |
| WO | WO 01/19006 A1 | 3/2001 |
| WO | WO 01/67694 A1 | 9/2001 |
| WO | WO 01/76160 | 10/2001 |
| WO | WO 01/86998 A1 | 11/2001 |
| WO | WO 02/41663 A2 | 5/2002 |
| WO | WO 02/067505 A1 | 8/2002 |

OTHER PUBLICATIONS

Yoo et. al. "Optical Burst Switching for Service Differentiation in the Next-Generation Optical Internet." IEEE. Feb. 2001. pp. 98-104.*

Guillemot et. al. "Transparent Optical Packet Switching: The European ACTS KEOPS Project Approach." IEEE 1998 / Journal of Lightwave Technology, vol. 16, No. 12, Dec. 1998. pp. 2117-2126.*

Guillemot et al., "Transparent optical packet switching: the European ACTS KEOPS project approach", IEEE Journal of Lightwave Technology, vol. 16, No. 12, Dec. 1998, pp. 2117 2134.*

Jacob et al., "Delay performance of some scheduling strategies in an input queuing ATM switch with multiclass bursty traffic", IEEE/ACM Transactions on Networking, vol. 4, No. 2, Apr. 1996, pp. 258-271.*

Yoo et al., "Optical burst switching for service differentiation in the next-generation optical internet", IEEE Communication Magazine, Feb. 2001, pp. 98-104.*

Baldine, Ilia, et al., "JumpStart: A Just-in-Time Signaling Architecture for WDM Burst-Switched Networks", IEEE Communications Magazine, vol. 40, No. 2, pp. 82-89 (Feb. 2002).

Bernstein, Greg, et al., "OIF UNI 1.0—Controlling Optical Networks", White Paper, Optical Internetworking Forum, pp. 1-3 (2001).

Carena, A., et al., "OPERA: An Optical Packet Experimental Routing Architecture with Label Swapping Capability", Journal of Lightwave Technology, vol. 16, No. 12, pp. 2135-2145 (Dec. 1998).

Chaskar, Hemant M., et al., "Robust Transport of IP Traffic over WDM Using Optical Burst Switching", Optical Networks Magazine, vol. 3, No. 4, pp. 47-60 (Jul.-Aug. 2002).

Cidon, Israel, et al., "Connection Establishment in High-Speed Networks", IEEE/ACM Transactions on Networking, vol. 1, No. 4, pp. 469-481 (Aug. 1993).

(56) References Cited

OTHER PUBLICATIONS

Erdogan, Turan, "Fiber Grating Spectra", Journal of Lightwave Technology, vol. 15, No. 8, pp. 1277-1294 (Aug. 1997).
Gallaher, Rick, "An Introduction to MPLS" (Sep. 10, 2001).
Gambini, Piero, et al., "Transparent Optical Packet Switching: Network Architecture and Demonstrators in the KEOPS Project", IEEE Journal on Selected Areas in Communications, vol. 16, No. 7, pp. 1245-1259 (Sep. 1998).
Giles, C. R., et al., "Lightwave Applications of Fiber Bragg Gratings", Journal of Lightwave Technology, vol. 15, No. 8, pp. 1391-1404 (Aug. 1997).
Guillemot, Christian, et al., "Transparent Optical Packet Switching: The European ACTS KEOPS Project Approach", IEEE, Journal of Lightwave Technology, vol. 16, No. 12, pp. 2117-2134 (Dec. 1998).
Hill, Kenneth O., et al., "Fiber Bragg Grating Technology Fundamentals and Overview", Journal of Lightwave Technology, vol. 15, No. 8, pp. 1263-1276 (Aug. 1997).
Liu, Hang, et al., "GMPLS-Based Control Plane for Optical Networks: Early Implementation Experience", Proceedings of the International Society for Optical Engineering (SPIE), vol. 4872, pp. 220-229 (Jul. 29, 2002).
Mehrotra, Pronita, et al., "Network Processor Design for Optical Burst Switched Networks", Proceedings of the 14th Annual IEEE International ASIC/SOC Conference, pp. 296-300 (Sep. 12-15, 2001).
Mizuhara, Bun, et al., "MPLS Technologies for IP Networking Solution", NEC Research and Development, vol. 42, No. 2, pp. 161-165 (Apr. 2001).
Oh, Se-yoon, et al., "A Data Burst Assembly Algorithm in Optical Burst Switching Networks", Electronic and Telecommunications Research Institute (ETRI) Journal, vol. 24, No. 4, pp. 311-322 (Aug. 2002).
O'Mahony, Mike J., et al., "The Application of Optical Packet Switching in Future Communication Networks", IEEE Communications Magazine, vol. 39, No. 3, pp. 128-135 (Mar. 2001).
Ovadia, Shlomo, et al., "Photonic Burst Switching (PBS) Architecture for Hop and Span-Constrained Optical Networks", IEEE Optical Communications, vol. 41, No. 11, pp. S24-S32 (Nov. 2003).
Qiao, Chunming, et al., "Polymorphic Control for Cost-Effective Design of Optical Networks", European Transactions on Telecommunications (ETT), vol. 11, No. 1, pp. 17-26 (Jan.-Feb. 2000).
Qiao, Chunming, "Labeled Optical Burst Switching for IP-over-WDM Integration", IEEE Communications Magazine, vol. 38, No. 9, pp. 104-114 (Sep. 2000).
Qiao, Chunming, et al., "Optical Burst Switching", Business Briefing: Global Photonics Applications & Technology, pp. 108-113 (Nov. 2001).
Shibata, Yasuo, et al., "Coupling Coefficient Modulation of Waveguide Grating Using Sampled Grating", IEEE Photonics Technology Letters, vol. 6, No. 10, pp. 1222-1224 (Oct. 1994).
Studenkov, P.V., et al., "Asymmetric Twin-Waveguide 1.55-um Wavelength Laser with a Distributed Bragg Reflector", IEEE Photonics Technology Letters, vol. 12, No. 5, pp. 468-470 (May 2000).
Sugden, K., et al., "Fabrication and Characterization of Bandpass Filters Based on Concatenated Chirped Fiber Gratings", Journal of Lightwave Technology, vol. 15, No. 8, pp. 1424-1432 (Aug. 1997).
Wei, Wei, et al., "GMPLS-Based Hierarchical Optical Routing Switching Architecture", Proceedings of the International Society for Optical Engineering (SPIE), vol. 4585, pp. 328-334 (Nov. 13, 2001).
Wiesmann, D., et al., "Apodized Surface-Corrugated Gratings with Varying Duty Cycles", IEEE Photonics Technology Letters, vol. 12, No. 6, pp. 639-641 (Jun. 2000).
Wilber, A.E., et al., "Tunable Compensation of Channel Degrading Effects Using Nonlinearly Chirped Passive Fiber Bragg Gratings", IEEE Journal of Selected Topics in Quantum Electronics, vol. 5, No. 5, pp. 1298-1311 (Sep.-Oct. 1999).
Yao, Shun, et al., "All-Optical Packet Switching for Metropolitan Area Networks: Opportunities and Challenges", IEEE Communications Magazine, vol. 39, No. 3, pp. 142-148 (Mar. 2001).

Zhong, Wen De, et al., "A New Wavelength-Routed Photonic Packet Buffer Combining Traveling Delay Lines with Delay-Line Loops", Journal of Lightwave Technology, vol. 19, No. 8, pp. 1085-1092 (Aug. 2001).
Qiao, Chunming DR. et al., "Optical Burst Switching", Business Briefing: Global Photonics Applications and Technology, pp. 108-112.
Sugden, K: et al., "Fabrication and Characterization of Bandpass Filters Based on Concatenated Chirped Faber Gratings", Journal of Lightwave Technology, vol. 15, No. 8, Aug. 1997, pp. 1424-1432.
IETF Network Working Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.
"Compare SANs to Alternate Technologies", Brocade, Retrieved on Feb. 26, 2003 from http://www.brocade.com/san/evaluate/compare_san.jsp.
Khattar, Ravi Kumar et al., "Introduction to Storage Area Network, SAN", International Technical Support Organization, Aug. 1999, www.redbooks.ibm.com.
Sahara, A. et al., "Demonstration of Optical Burst Data Switching Using Photonic MPLS Routers Operated by GMPLS Signaling," OFC 2003, vol. 1, pp. 220-222.
Comellas, J. et al., "Integrated IP/WDM Routing in GMPLS-Based Optical Networks", IEEE Network, Mar./Apr. 2003, pp. 22-27.
"Generalized Multiprotocol Label Switching (GMPLS)", Copyright © The International Engineering Consortium, Web ProForum Tutorials http://www.iec.org, pp. 1-27.
Floyd, Sally et al., "Modifying TCP's Congestion Control for High Speeds", May 5, 2002, pp. 1-5.
Fredj, Ben S. et al., "Statistical Bandwidth Sharing: A Study of Congestion at Flow Level", France Telecom R&D, pp. 111-122.
Zeljkovic, Nada et al., "A Simulation Analysis of Statistical Multiplexing in Frame Relay and ATM Internworking", TELESIKS 2001, Sep. 19-21, 2001, Nis, Yugoslavia, pp. 116-119.
Office Action received for Chinese Patent Application No. 200310123330.1 Mailed on Jul. 10, 2009, 4 pages of Office Action and English translation of 6 pages.
Kumaran, Krishnan et al., "Multiplexing Regulated Traffic Streams: Design and Performance", Bell Laboratories/Lucent Technologies, IEEE INFOCOM 2001, pp. 527-536.
Su, C.-F. et al., "On Statistical Multiplexing, Traffic Mixes, and VP Management", University of Texas at Austin, 1998 IEEE.
Brown, Timothy X., "Adaptive Statistical Multiplexing for Broadband Communitcation", Performance Evaluation and Application of ATM Networks, Kouvatsos, D. editor, Kluwer, 2000, pp. 51-80.
Walch, Philip F., "FEC Standards and Long Haul STM-64 DWDM Transmission," Contribution to T1 Standards Project T1X1.5, Jan. 17-20, 2000, pp. 1-4.
"ITU-T Rec. G.709/Y.133—Interfaces for the Optical Transport Network (OTN)," International Telecommunication Union, Mar. 2003, pp. 1-109.
Henderson, Michael P., "Forward Error Correction in Optical Network," Mar. 27, 2001. http://members.cox.net/michaeo.henderson/Papers/Optical_FEC.pdf, pp. 1-18.
Banerjee, A. et al., "Generalized Multiprotocol Label Switching: An Overview of Routing and Management Enhancements," IEEE Communications Magazine, Jan. 2001, pp. 144-150.
Kim, Y. et al., "Discrete Event Simulation of the DiffServ-over-MPLS with NIST GMPLS Lightwave Agile Switching Simulator (GLASS)," Joint Conference of Communication and Information—2002, Jeju, Korea, 4 pgs.
Cao, Xiaojun et al., "Assembling TCP/IP Packets in Optical Burst Switched Networks", IEEE Global Telecommunications Conference, 2002, pp. 2808-2812, vol. 1, New York.
Wang, S.Y., "Using TCP Congestion Control to Improve the Performance of Optical Burst Switched Networks", IEEE International Conference on Communications, 2003, pp. 1438-1442, Taiwan.
Detti, Andrea et al., "Impact of Segments Aggregation on TCP Reno Flows in Optical Burst Switching Networks", IEEE Infocom, 2002, pp. 1803-1805, vol. 1, New York.
Ghani, Nasir et al., "On IP-over-WDM Integration", IEEE Communications Magazine, Mar. 2000, pp. 72-84.

(56) References Cited

OTHER PUBLICATIONS

Yoo, S.J. Ben, "Optical-label switching, MPLS, MPLambdaS, and GMPLS", Optical Networks Magazine, May/Jun. 2003, pp. 17-31.
Rekhter, Y. et al., "A Border Gateway Protocol 4 (BGP-4)", Network Working Group, Mar. 1995, pp. 1-57.
Final Office Action mailed on Oct. 26, 2006. U.S. Appl. No. 10/377,580, filed Feb. 28, 2003, Maciocco et al.
Office Action mailed on Oct. 18, 2006. U.S. Appl. No. 10/459,781, filed Jun. 11, 2003, Ovadia et al.
Office Action mailed on Nov. 14, 2006 U.S. Appl. No. 10/691,712, filed Oct. 22, 2003, Ovadia et al.
Office Action mailed on Nov. 15, 2006. U.S. Appl. No. 10/441,771, filed May 19, 2003, Ovadia et al.
Final Office Action mailed on Nov. 22, 2006. U.S. Appl. No. 10/464,969, filed Jun. 18, 2003, Maciocco et al.
Office Action mailed on Nov. 29, 2006. U.S. Appl. No. 10/417,823, filed Apr. 16, 2003, Ovadia et al.
Office Action mailed on Jan. 3, 2007. U.S. Appl. No. 10/668,874, filed Sep. 23, 2003, Ovadia et al.
Office Action mailed on Dec. 29, 2006. U.S. Appl. No. 10/418,487, filed Apr. 17, 2003, Ovadia et al.
Office Action mailed on Jan. 10, 2007. U.S. Appl. No. 10/636,062, filed Aug. 6, 2003, Maciocco et al.
Final Office Action mailed on Jan. 17, 2007. U.S. Appl. No. 10/606,323, filed Jun. 24, 2003, Maciocco et al.
Final Office Action mailed on Feb. 9, 2007. U.S. Appl. No. 373,312, filed Feb. 28, 2003, Maciocco et al.
Office Action mailed on Feb. 20, 2007. U.S. Appl. No. 10/377,580, filed Feb. 28, 2003, Maciocco et al.
Office Action mailed on Mar. 21, 2007. U.S. Appl. No. 10/713,585, filed Nov. 13, 2002, Ovadia et al.

* cited by examiner

OPTICAL DATA BURST FORMAT

OPTICAL CONTROL BURST FORMAT

METHOD AND APPARATUS OF THE ARCHITECTURE AND OPERATION OF CONTROL PROCESSING UNIT IN WAVELENGHT-DIVISION-MULTIPLEXED PHOTONIC BURST-SWITCHED NETWORKS

FIELD

The present disclosure relates generally to optical networking systems, and more specifically to optical networking systems operating in photonic burst-switched modes.

BACKGROUND

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (OEO) conversion of optical signals is done at the optical switches. OEO conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large access network can be implemented using several access sub-networks. For example, a large access network to support Internet traffic can be divided into a large number of relatively small access networks operated by Internet service providers (ISPs), which are coupled to a number of optical metropolitan area networks (Optical MANs), which are in turn coupled to a large optical "backbone" wide area network (WAN). While the local-area networks (LANs) can be relatively low bandwidth, the optical MANs and WANs typically require high bandwidth in order to provide a level of service demanded by their high-end users.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following disclosure describes techniques for routing data bursts in a photonic burst-switched network. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of hardware within a microprocessor system. However, the invention may be practiced in other forms of processor such as a digital signal processor, a minicomputer, or a mainframe computer.

Figure 1:
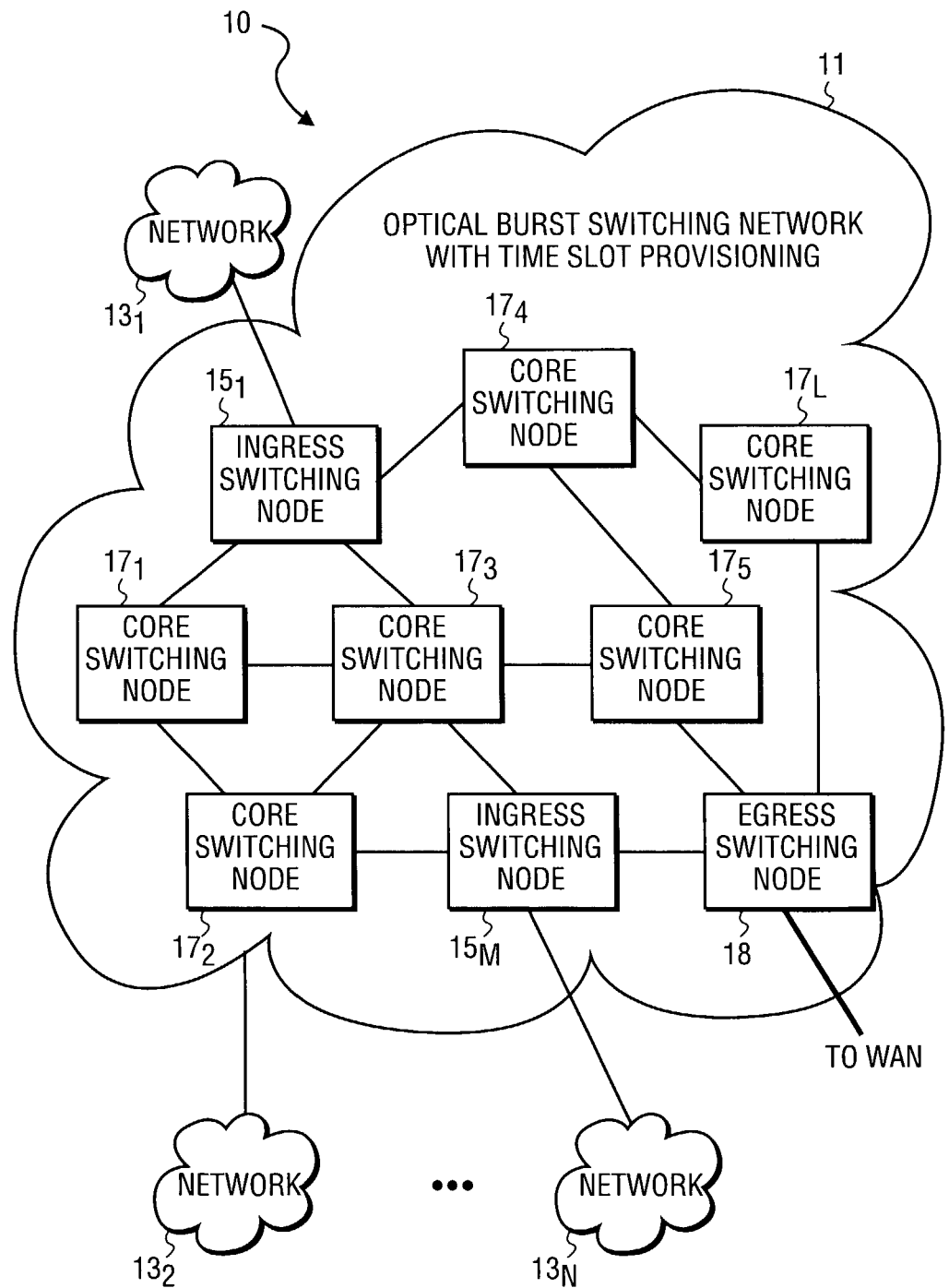
FIG. 1 is a simplified block diagram illustrating a photonic burst switching network, according to one embodiment of the present invention.

FIG. 1 illustrates a photonic burst-switched network 10, according to one embodiment of the present invention. The term photonic burst is used herein to refer to statistically-multiplexed packets (e.g., internet protocol (IP) packets) having similar routing requirements. A photonic burst typically includes a photonic control burst containing the header and other routing information of the IP packets and a payload containing the data segments of the packets.

This embodiment of photonic burst-switched network 10 includes an optical MAN 11, local area networks (LANs) $13_1$-$13_N$ and a backbone optical WAN (not shown). In addition, this embodiment of optical MAN 11 includes ingress switching nodes $15_1$-$15_M$, core switching nodes $17_1$-$17_L$, and egress switching node 18. Optical MAN 11 can include other ingress and core switching nodes (not shown) that are interconnected with the switching nodes shown in FIG. 1. In this embodiment, the ingress, egress and core switching nodes are implemented with intelligent modules.

In this embodiment, ingress switching nodes $15_1$-$15_M$ are implemented as label switch routers (LSR) with the appropriate optical interface units or modules, where each is configured to receive IP packets from a LAN (via a label switch router (LSR) in some embodiments), and receive optical signals from core switching nodes $17_1$-$17_M$ of optical MAN 11. In addition, ingress switching nodes $15_1$-$15_M$ are configured to transmit optical signals to core switching nodes $17_1$-$17_M$ of optical MAN 11. In one embodiment, the ingress switching nodes perform optical-electrical (OE) conversion of received optical signals, and include electronic memory to buffer the received signals until they are sent to the appropriate LAN. In another embodiment, the ingress switching nodes perform electrical-optical (EO) conversion of the received electrical signals before they are transmitted to core switching nodes $17_1$-$17_M$ of optical MAN 11. Embodiments of the ingress switching nodes are described further below.

Egress switching node 18 is implemented with optical switching units or modules that are configured to receive optical signals from other nodes of optical MAN 11 and route them to the optical WAN. Egress switching node 18 can also receive optical signals from the optical WAN and send them to the appropriate node of optical MAN 11. In one embodiment, egress switching node 18 performs OEO conversion of received optical signals, and includes electronic memory to buffer received signals until they are sent to the appropriate node of optical MAN 11 (or to the optical WAN). Embodiments of egress switching node 18 are described further below.

Core switching nodes $17_1$-$17_L$ are implemented with optical switching units or modules that are each configured to receive optical signals from other switching nodes and appropriately route the received optical signals to other switching nodes of optical MAN 11. As is described below, the core switching nodes perform OEO conversion of optical control bursts and network management control label signals. In some embodiments, these optical control bursts and control labels are propagated only on preselected wavelengths. The preselected wavelengths do not propagate optical "data" burst (as opposed to control bursts and control labels) signals in such embodiments, even though the burst and network management control labels may be include necessary information for a particular group of optical data burst signals. In another embodiment, optical control bursts, network management control labels, and optical data burst signals may be propagated on the same wavelength(s) using different encoding schemes such as different modulation formats, etc. In either approach, the optical control bursts and control labels are sent asynchronously relative to its corresponding optical data burst signals. In still another embodiment, the optical control bursts and control signals are propagated at different transmission rates as the optical data signals.

Although core switching nodes $17_1$-$17_L$ may perform OEO conversion of the optical control signals, in this embodiment, the core switching nodes do not perform OEO conversion of the optical data burst signals. Rather, core switching nodes $17_1$-$17_L$ perform purely optical switching of the optical data burst signals. Thus, the core switching nodes can include electronic circuitry to store and process the incoming optical control bursts and network management control labels that were converted to an electronic form and use this information to configure the photonic burst switch (PBS) settings, and to properly route the optical data burst signals corresponding to the optical control bursts. The new control bursts, which replace the previous control bursts based on the new routing information, are converted to an optical control signal, and it is transmitted to the next core or egress switching nodes. Embodiments of the core switching nodes are described further below.

The elements of exemplary photonic burst switching network 10 are interconnected as follows. LANs $13_1$-$13_N$ are connected to corresponding ones of ingress switching nodes $15_1$-$15_M$ of optical MAN 11.

Within optical MAN 11, ingress switching nodes $15_1$-$15_M$ and egress switching node 18 are connected to some of core switching nodes $17_1$-$17_L$ via optical fibers. Core switching nodes $17_1$-$17_L$ are also interconnected to each other via optical fibers in mesh architecture to form a relatively large number of optical paths or links between the ingress switching nodes, and between ingress switching nodes $15_1$-$15_L$ and egress switching node 18. Ideally, core switching nodes $17_1$-$17_L$ provide more than one optical path between each end point of optical MAN 11 (i.e., the ingress switching nodes and egress switching node 18 are endpoints within optical MAN 11). Multiple optical paths between core switching nodes, ingress nodes, and egress nodes enable fast reroute and protection switching when one or more node fails.

As described below in conjunction with FIG. 2, the ingress, egress and core switching nodes of optical MAN 11 are configured to send and/or receive optical control bursts, optical data bursts, and other control signals that are wavelength multiplexed so as to propagate the optical control bursts and control labels on pre-selected wavelength(s) and optical data bursts or payloads on different preselected wavelength(s). In addition, optical data bursts can be time division multiplexed (TDM) on a given wavelength. Still further, the endpoints of optical MAN 11 can send optical control burst signals when sending data out of optical MAN 11.

Figure 2:
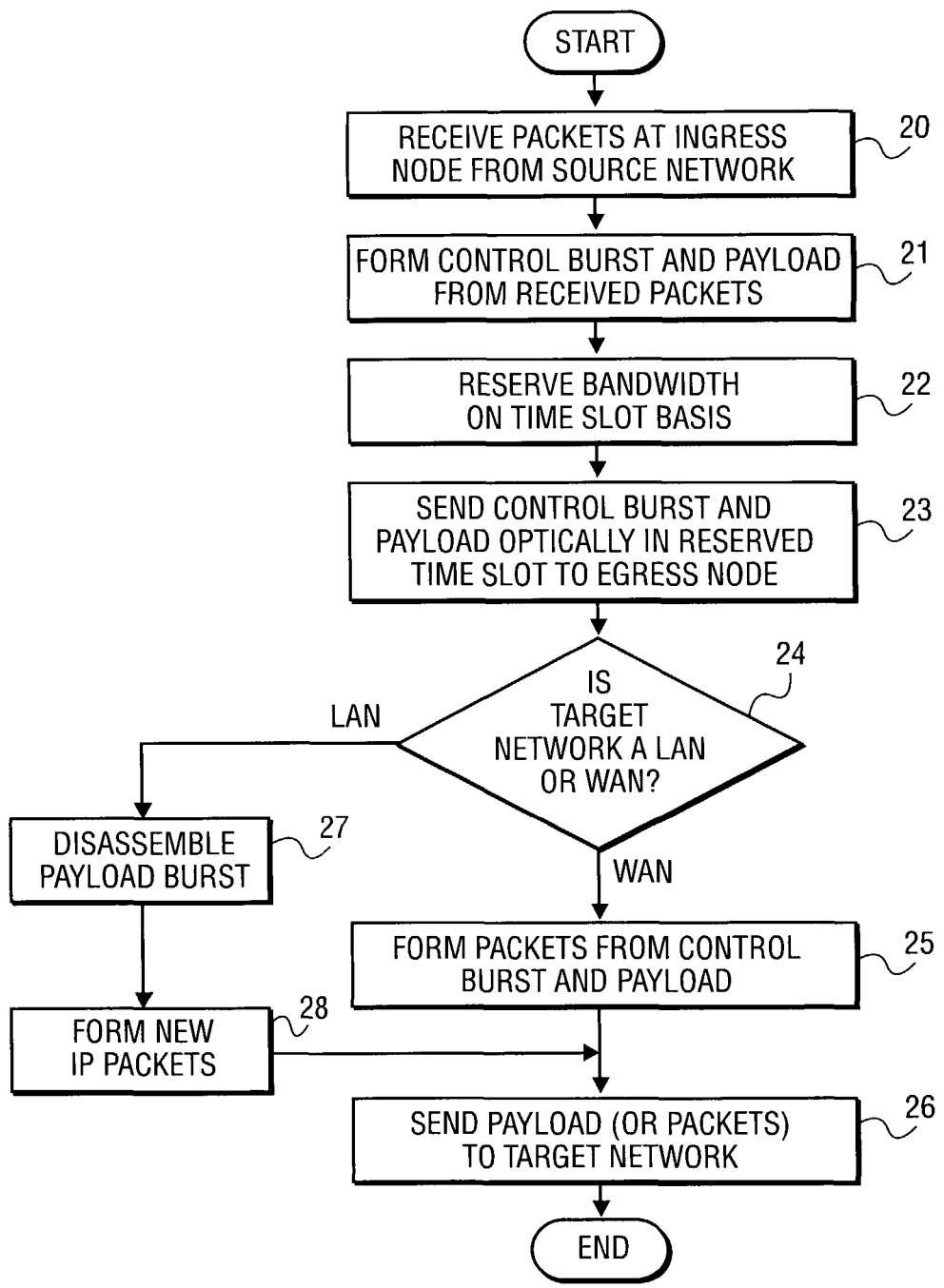
FIG. 2 is a simplified flow diagram illustrating the operation of a photonic burst switching network, according to one embodiment of the present invention.

FIG. 2 illustrates the operational flow of photonic burst switching network 10, according to one embodiment of the present invention. Referring to FIGS. 1 and 2, photonic burst switching network 10 operates as follows.

Optical MAN 11 receives packets from LANs $13_1$-$13_N$. In one embodiment, optical MAN 11 receives IP packets at ingress switching nodes $15_1$-$15_M$. The received packets can be in electronic form rather than in optical form, or received in optical form and then converted to electronic form. In this embodiment, the ingress switching nodes store the received packets electronically. A block 20 represents this operation.

For clarity, the rest of the description of the operational flow of photonic burst switching network 10 focuses on the transport of information from ingress switching node $15_1$ to egress switching node 18. The transport of information from ingress switching nodes $15_2$-$15_M$ is substantially similar.

An optical control burst and payload (i.e., an optical data burst) is formed from the received packets. In one embodiment, ingress switching node $15_1$ uses statistical multiplexing techniques to form the optical data burst from the received IP (Internet Protocol) packets stored in ingress switching node $15_1$. For example, packets received by ingress switching node $15_1$ and having to pass through egress switching node 18 on their paths to a destination can be assembled into an optical data burst. A block 21 represents this operation.

Bandwidth is reserved to transport the optical data burst through photonic burst switching network 10. In one embodiment, ingress switching node $15_1$ reserves a time slot (e.g., a TDM channel of a TDM system) in an optical data signal path through photonic burst switching network 10. Further, in one embodiment, the bandwidth is reserved for a time period sufficient to transport the optical burst from the ingress switching node to the egress switching node. For example, in some embodiments, the ingress, core, and egress switching nodes maintain an updated list of all used and available time slots. The time slots can be allocated and distributed over multiple wavelengths and optical fibers. Thus, a reserved time slot (also referred to herein as a TMD channel, which in differing embodiments may be either fixed-duration or variable duration TDM channels) may be in one wavelength of one fiber, or can be spread across multiple wavelengths and multiple optical fibers. A block 22 represents this operation.

When an ingress and/or egress switching node reserves bandwidth or when bandwidth is released after an optical data burst is transported, a network controller (not shown) updates the list. In one embodiment, the network controller and the ingress or egress switching nodes perform this updating process using various burst or packet scheduling algorithms based on the available network resources and traffic patterns. The available variable-duration TDM channels, which are periodically broadcasted to all the ingress, core, and egress switching nodes, are transmitted on the same wavelength as the optical control bursts or on a different common preselected wavelength throughout the optical network. The network controller function can reside in one of the ingress and egress switching nodes or can be distributed across two or more ingress and egress switching nodes. In this embodiment, the network controller also resides in the core switching node (e.g., processors 82 or 83 of FIG. 8).

The optical control bursts, network management control labels, and optical data bursts are then transported through photonic burst switching network 10 in the reserved variable-duration TDM channels. That is, each of the reserved time slots can have different time durations, depending on the data burst lengths. In one embodiment, ingress switching node $15_1$ transmits the control burst to the next switching node along the optical label-switched path (OLSP) determined by the network controller. In this embodiment, the network controller uses a constraint-based routing protocol (e.g., multi-protocol label switching MPLS) over one or more wavelengths to determine the best available OLSP to the egress switching node. In one embodiment, ingress switching node $15_1$ then asynchronously transmits the optical data burst to the destination egress node through core switching nodes $17_1$-$17_L$, where little or no time delay due to buffering or OEO conversion occurs at each core switching node.

In some embodiments, the core switching node may perform OEO conversion of the optical control burst so that the node can extract and process the routing information contained in the control burst. Further, in some embodiments, the variable-duration TDM channel is propagated in the same wavelengths that are used for propagating control bursts. Alternatively, the control bursts and payloads can be modulated on the same wavelength in the same optical fiber using different modulation formats. For example, optical control bursts can be transmitted using non-return-to-zero (NRZ) modulation format, while optical payloads are transmitted using return-to-zero (RZ) modulation format. The optical burst is transmitted from one core switching node to another core switching node in a similar optical MAN until the optical burst is terminated at egress switching node 18. A block 23 represents this operation.

The operational flow at this point depends on whether the target network is an optical WAN or a LAN. A block 24 represents this branch in the operational flow.

If the target network is an optical WAN, new optical control burst and payload signals are formed. In this embodiment, egress switching node 18 prepares the new optical control burst and payload signals. A block 25 represents this operation.

The new optical control burst and payload are then transmitted to the target network (i.e., WAN in this case). In this embodiment, egress switching node 18 includes an optical interface to transmit the optical control burst and payload to the optical WAN. A block 26 represents this operation.

However, if in block 24 the target network is a LAN, the optical data burst is disassembled to extract the IP packets. In this embodiment, egress switching node 18 converts the optical data burst to electronic signals that egress switching node 18 can process to recover the data segment of each of the packets. A block 27 represents this operation.

The extracted IP data packets are processed, combined with the corresponding IP labels, and then routed to the target network (i.e., LAN in this case). In this embodiment, egress switching node 18 forms these new IP packets. A block 28 represents this operation. The new IP packets are then transmitted to the target network (i.e., LAN) as shown in block 26.

Photonic burst switching network 10 can achieve increased bandwidth efficiency through the additional flexibility afforded by the TDM channels. Although this exemplary embodiment described above includes an optical MAN having ingress, core and egress switching nodes to couple multiple LANs to an optical WAN backbone, in other embodiments the networks do not have to be LANs, optical MANs or WAN backbones. That is, optical MAN 11 need not service a "metropolitan area". Rather, photonic burst switching network 10 may include a number of relatively small networks that are coupled to a relatively larger network that in turn is coupled to a backbone network.

Figure 3:
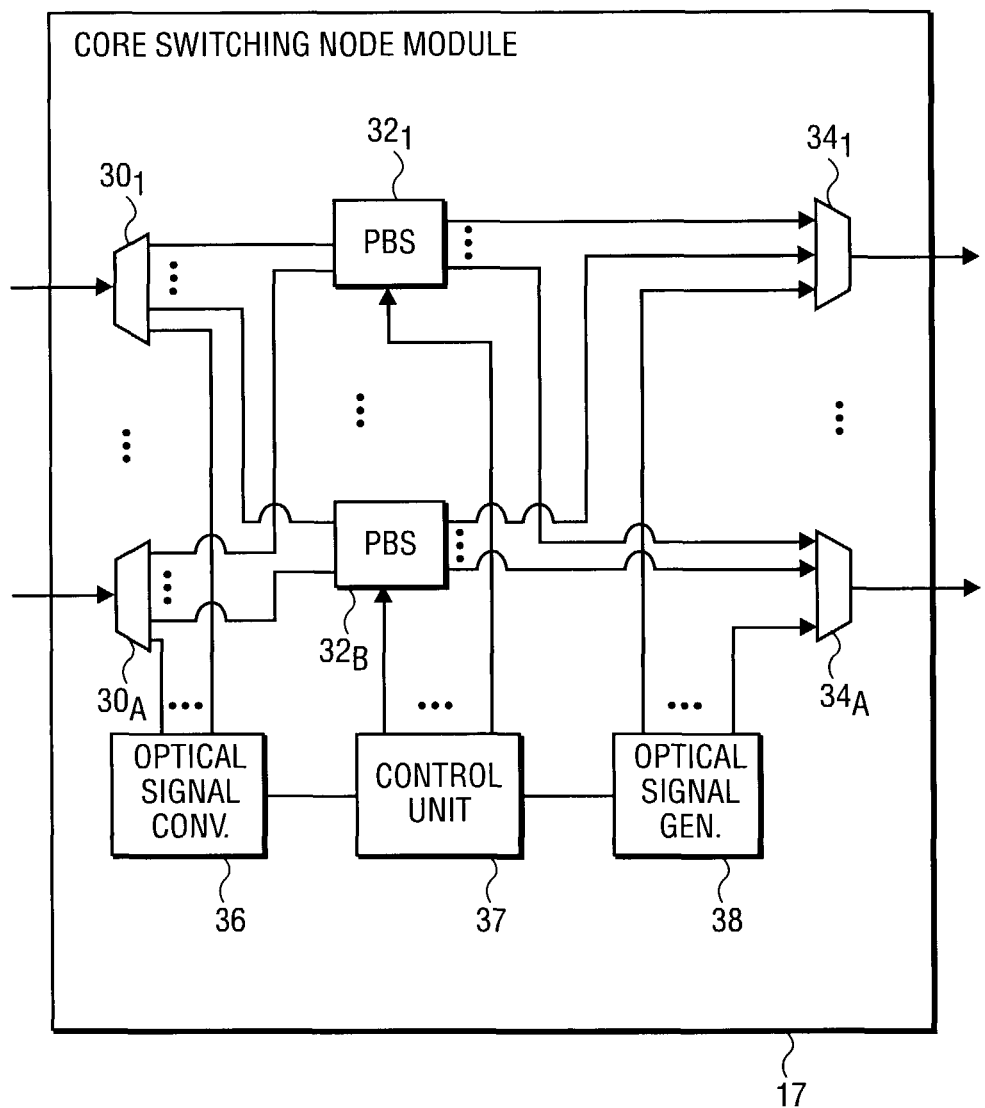
FIG. 3 is a block diagram illustrating a core switching node module for use in a photonic burst switching network, according to one embodiment of the present invention.

FIG. 3 illustrates a module 17 for use as a core switching node in photonic burst switching network 10 (FIG. 1), according to one embodiment of the present invention. In this embodiment, module 17 includes a set of optical wavelength division demultiplexers $30_1$-$30_A$, where A represents the number of input optical fibers used for propagating payloads, control bursts, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≥A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control interface unit 37, and a set of electrical-to-optical signal converters' 38 (e.g., lasers).

Figure 10:
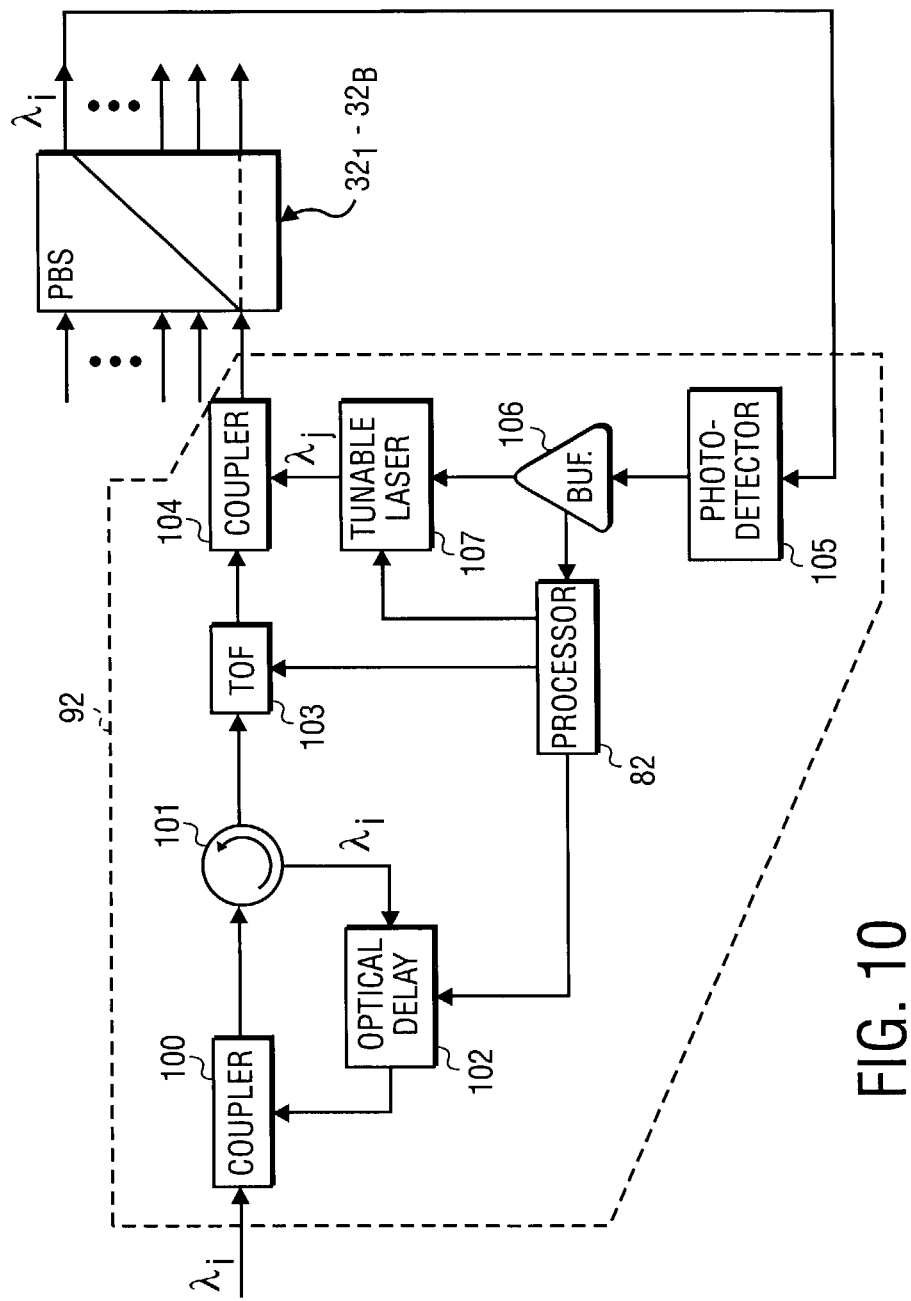
FIG. 10 is a block diagram illustrating a portion of the core switching node module with an optical buffer of FIG. 9, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switching network 10 (FIG. 10). The output leads of the optical demultiplexers are connected to the set of B core optical switches $32_1$-$32_B$ and to optical signal converter 36.

For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control labels. In one embodiment, the optical data burst and optical control bursts have transmission formats as shown in FIGS. 4A and 4B.

Figure 4A:
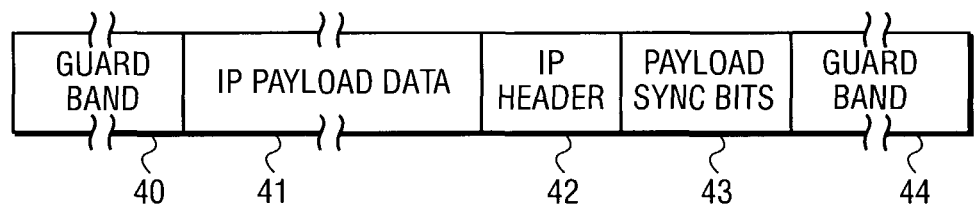
FIGS. 4A and 4B are diagram illustrating the format of an optical data burst and an optical control burst for use in a photonic burst-switched network, according to one embodiment of the present invention.

FIG. 4A illustrates the format of an optical data burst for use in photonic burst switching network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. IP payload data segment 41 includes the statistically-multiplexed IP data packets used to form the burst. Although FIG. 4A shows the payload as contiguous, module 17 transmits payloads in a TDM format. Further, in some embodiments the data burst can be segmented over multiple variable-duration TDM channels. It should be pointed out that in this embodiment, the optical data bursts and optical control bursts have local significance only at the optical MAN, and may lose their significance at the optical WAN.

Figure 4B:
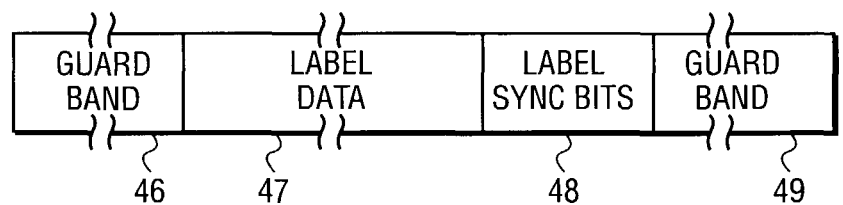

FIG. 4B illustrates the format of an optical control burst for use in photonic burst switching network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 contains all the necessary routing and timing information of the IP packets to form the optical burst. Although FIG. 4B shows the control burst as contiguous, in this embodiment module 17 transmits control bursts in a TDM scheme.

In some embodiments, an optical network management control label (not shown) is also used in photonic burst switching network 10 (FIG. 1). In such embodiments, each optical network management control label includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control label is transmitted in a TDM scheme.

Figure 5:
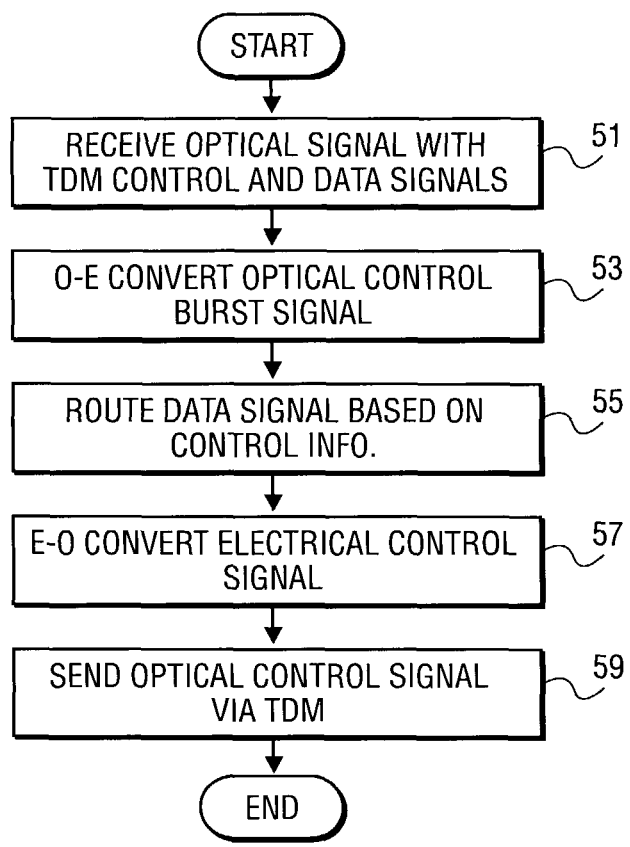
FIG. 5 is a flow diagram illustrating the operation of a core switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM control burst and data signals. In this embodiment, module 17 receives an optical control burst signal and an optical data burst signal at one or two of the optical demultiplexers. For example, the optical control burst signal may be modulated on a first wavelength of an optical signal received by optical demultiplexer $30_A$, while the optical data burst signal is modulated on a second wavelength of the optical signal received by optical demultiplexer $30_A$. In some embodiments, the optical control burst signal may be received by a first optical demultiplexer while the optical data burst signal is received by a second optical demultiplexer. Further, in some cases, only a network management control label is received. A block 51 represents this operation.

Module 17 converts the optical control burst signal into an electrical signal. In this embodiment, the control burst signal is the optical control burst signal, which is separated from the received optical signal by the optical demultiplexer and sent to optical-to-electrical signal converter 36. In other embodiments, the optical control burst signal can be a network management label (previously described in conjunction with FIG. 4B). Optical-to-electrical signal converter 36 converts the optical control burst signal into an electrical signal. For example, in one embodiment each portion of the TDM control burst signal is converted to an electrical signal. The electrical control bursts received by the control unit 37 are processed to form a new control burst. In this embodiment, control unit 37 stores and processes the control bursts. A block 53 represents this operation.

Module 17 then routes the optical data burst signals to one of optical multiplexers $34_1$-$34_A$, based on routing information contained in the control burst. In this embodiment, control unit 37 processes the control burst to extract the routing and timing information and sends appropriate PBS configuration signals to the set of B photonic burst switches $32_1$-$32_B$ to re-configure each of the core switches to switch the corresponding payload signals. A block 55 represents this operation.

Module 17 then converts the processed electrical control burst signal to a new optical control burst signal. In this embodiment, control unit 37 provides TDM channel alignment so that reconverted or new optical control bursts are generated in the desired wavelength and TDM channel pattern. The new control burst may be modulated on a wavelength and/or TDM channel that are different from the wavelength and TDM channel of the control burst signal received in block 51. A block 57 represents this operation.

Module 17 then sends the optical signal to the next switching node in the route. In this embodiment, electrical-to-optical signal generator 38 sends the new optical control burst signal to appropriate optical multiplexer of optical multiplexers $34_1$-$34_A$ to achieve the route. A block 59 represents this operation.

Figure 6:
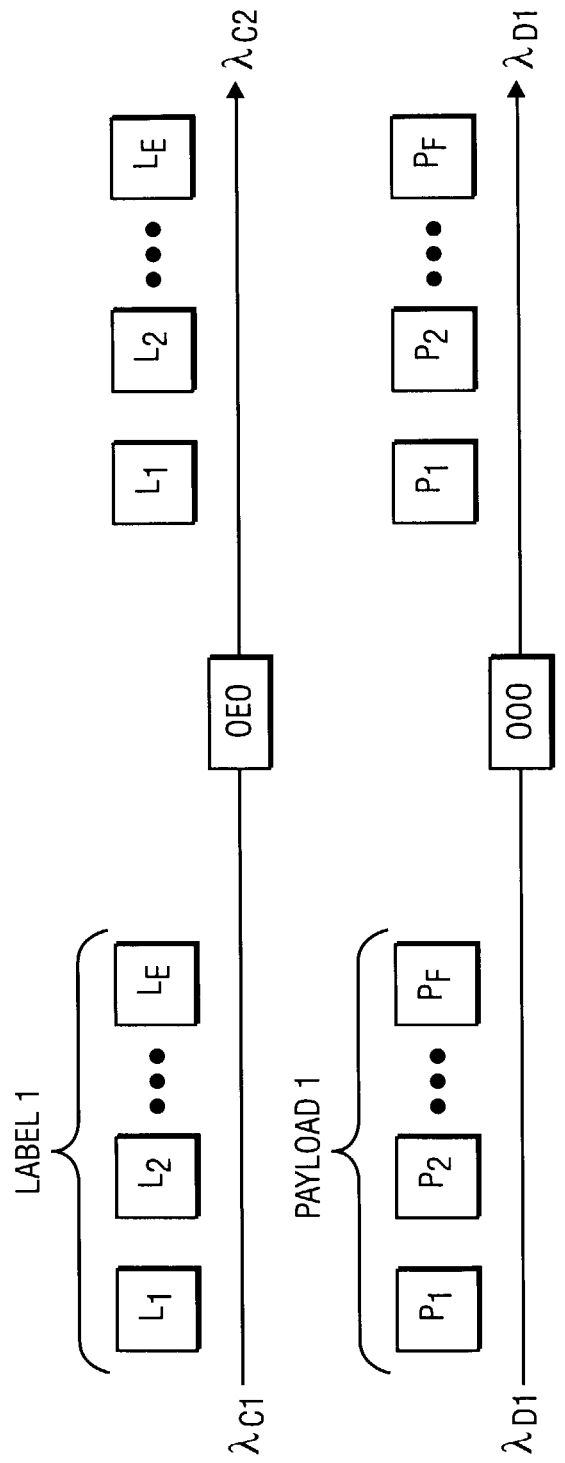
FIG. 6 is a diagram illustrating time domain multiplexing channel provisioning, according to one embodiment of the present invention.

FIG. 6 illustrates the variable-duration TDM channel provisioning, according to one embodiment of the present invention. In this example, a control burst signal is propagated on a control wavelength $\lambda_{C1}$ while the corresponding optical data burst signal is propagated on a data wavelength $\lambda_{D1}$ via an output optical fiber(s) selected according to the routing information contained in the optical control burst signal. In some embodiments, the optical control burst signal is transmitted before the optical data burst signal with sufficient lead time to allow one or more nodes along the optical path to process the control burst signal before the data burst signal is routed at the first switching node. This lead time may be called an offset time in the remaining discussion. In this way, the switching modules can configure their photonic burst switches $32_1$-$32_B$ to transport the data burst signals with minimal delay. As shown in FIG. 6, in this example the control burst signal is TDM transmitted in E portions on control wavelength $\lambda_{C1}$.

Although not shown, other optical control burst signals can be TDM transmitted in different time-duration slots of wavelength $\lambda_{C1}$. The optical data burst signal in this example is TDM transmitted in F portions on data wavelength $\lambda_{D1}$. Each of the F portions of the optical data burst signal can have different time durations, depending on how the reserved bandwidth has been allocated. In some embodiments, there may be a stream or sequence of optical data bursts transmitted in an allocation of TDM channels.

When received by a module (e.g., module 17 of FIG. 3), the optical control burst signal undergoes OE conversion so that the control burst signal can be processed to extract control burst information (e.g., routing and timing information). The processed control burst signal undergoes EO conversion, and then transmitted out of the module via an output optical fiber(s) selected by the routing information extracted from the received control burst signal. In this embodiment, the optical control burst signal can be transmitted on a different control wavelength (e.g., wavelength $\lambda_{C2}$) as shown in the FIG. 6 example. In other instances, the module can transmit the new control burst signal on the same control wavelength that the module received the control burst signal.

The optical payload signal, when received by the module, is not OEO converted. Rather, the photonic burst switch module switches the optical payload signal within the appropriate variable-duration TDM channel, and route the payload signal to the next switching node based on the new routing information contained in the new control burst. The variable-duration TDM channel is on the same data wavelength (wavelength $\lambda_{D1}$) as shown in the FIG. 6 example, but the wavelength is propagated by the optical fiber selected by the photonic burst switches of the module. In some embodiments, the photonic burst switch module may change the available TDM channel using fiber delay lines.

Figure 7:
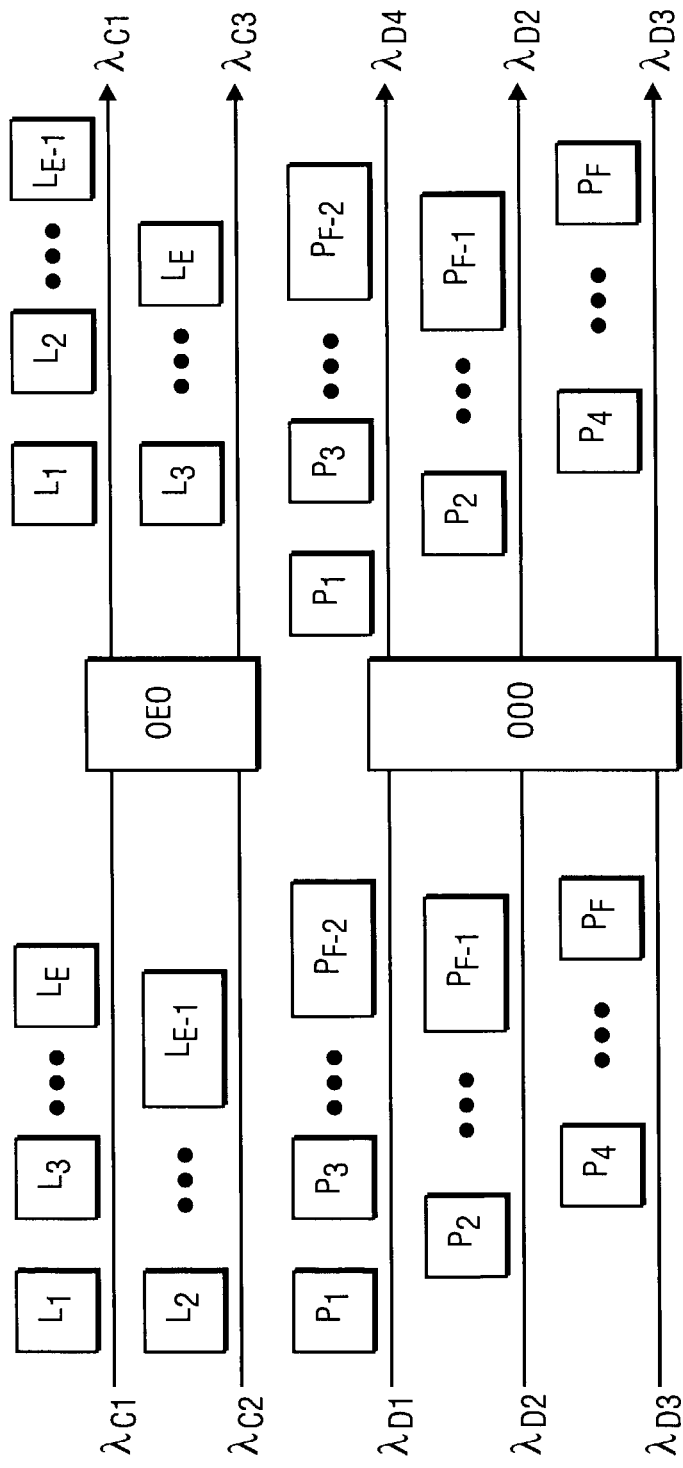
FIG. 7 is a diagram illustrating muiti-wavelength time domain multiplexing channel provisioning, according to one embodiment of the present invention.

FIG. 7 illustrates multi-wavelength variable-duration TDM channel provisioning, according to one embodiment of the present invention. In this example, the control burst signal is TDM propagated on control wavelengths $\lambda_{C1}$ and $\lambda_{C2}$. After OE conversion, the new control burst signal can be TDM transmitted on different wavelengths and/or TDM channel. As shown in FIG. 7, some TDM portions of the control burst signal are propagated in TDM channels on wavelength $\lambda_{C1}$ while others are propagated in TDM channels on wavelength $\lambda_{C3}$. In other embodiments, different control wavelengths can be used.

Similarly, the TDM portions of the payload signal are distributed over multiple wavelengths. In this example, the TDM portions of the optical payload signal are optically switched to the selected output optical fibers on the same wavelengths and TDM channels as received. However, in other embodiments, the TDM portions of the optical payload signal can be transmitted in different TDM channels.

Figure 8:
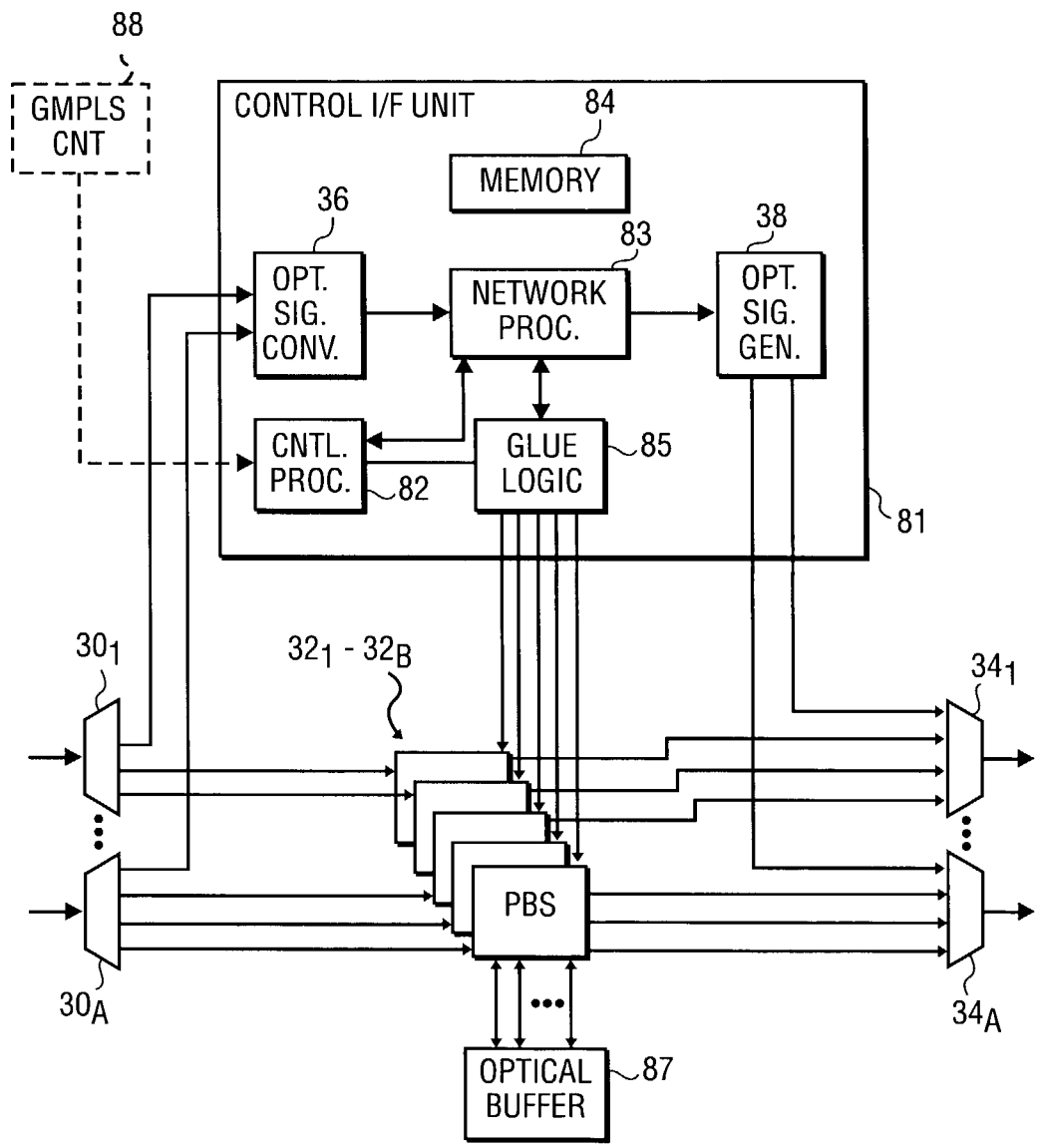
FIG. 8 is a block diagram illustrating a core switching node module that supports generalized multi-protocol control burst switching (GMPLS), according to one embodiment of the present invention.

FIG. 8 illustrates module 17 that implements a core switching node of photonic burst switching network 10 (FIG. 1) that supports generalized multi-protocol label switching (GMPLS), according to one embodiment of the present invention. This embodiment is similar to the embodiment of FIG. 3, except that control unit 37 is contained in a control interface unit 81 that also contains the set of optical-to-electrical signal converters 36 and the set of electrical-to-optical signal generators 38. In addition, control unit 37 is implemented with a control processor 82, a network processor 83, memory 84 and glue logic 85. This embodiment of module 17 also includes an optical buffer 87 implemented with precision fiber delay lines.

In this embodiment, photonic burst switches $32_1$-$32_B$ are implemented using the fast polysilicon trench waveguide technology disclosed in two co-pending and commonly assigned U.S. Patent Applications both entitled "Method and Apparatus For Steering An Optical Beam In A Semiconductor Substrate", Ser. No. 09/811,171 filed Mar. 16, 2001 by Ansheng Liu et al., and Ser. No. 09/819,160 filed Mar. 27, 2001 by Ansheng Liu et al. In other embodiments, different technologies can be used to implement the photonic burst switches. Photonic burst switches $32_1$-$32_B$ provide N×N switching under the control of control interface unit 81.

This embodiment of module 17 operates in substantially the same way as described above in conjunction with FIGS. 3 and 5. More particularly to this embodiment, control processor 82 can receive GMPLS information from a network controller 88 (shown in dashed lines). In such an embodiment, the network controller can be a hardware processing unit such as control processor 82, and/or a software module residing at either control processor 82 or in the network processor 83. In this embodiment, network controller 88 is configured to provide a unified control plane signaling using known GMPLS protocols. In this way, network controller 88 can maintain an updated list of available TDM channels, and network resources and constraints, and determine efficient routes to transport an optical data burst. In another embodiment, the network controller can reside as a software module in network processor 83.

Network processor 83 can perform many different packet processing functions such as label swapping, TDM channel control, control bursts' framing/de-framing, assembly/disassembly, network management control, and other necessary functions. In some embodiments, the control bursts can be nested inside other control bursts, giving rise to hierarchy of control bursts. Nested control bursts may have utility because, once an OLSP is established, it may be used for subsequent data burst transmission. Network processor 83 can provide synchronization and control signals to glue logic 85 to control the operation and switch configuration settings of the photonic burst switches to process the routing information extracted from received control burst signals. Network processor 83 can also control the photonic burst switches to route signals to optical buffer 87 when a desired variable-duration TDM channel is not available (e.g., due to contention). In accordance of the teachings of embodiments of this invention for photonic burst switching network 10 (FIG. 1), the size of optical buffer 87 (e.g., the length of the optical fiber delay lines) can be significantly smaller than what would be required to implement for a conventional optical burst or packet switching network.

Similarly, this embodiment of module 17 can be modified to implement an ingress module by adding an electronic input interface to receive and store IP packets from the access networks and circuitry for electrical-to-optical conversion of the stored packet header and data segments that are combined to form an optical burst. This embodiment of module 17 may also be modified to implement an egress module by adding an electronic output interface to store and transmit IP packets into the access networks and circuitry for optical-to-electrical conversion of the received optical control and data bursts and network management labels into IP packets. It is noteworthy that either of these modifications should be bi-directional. For example, an ingress module should also be able to receive optical data and control bursts and convert them into electronic form as IP packets to be sent back into the access networks.

Figure 9:
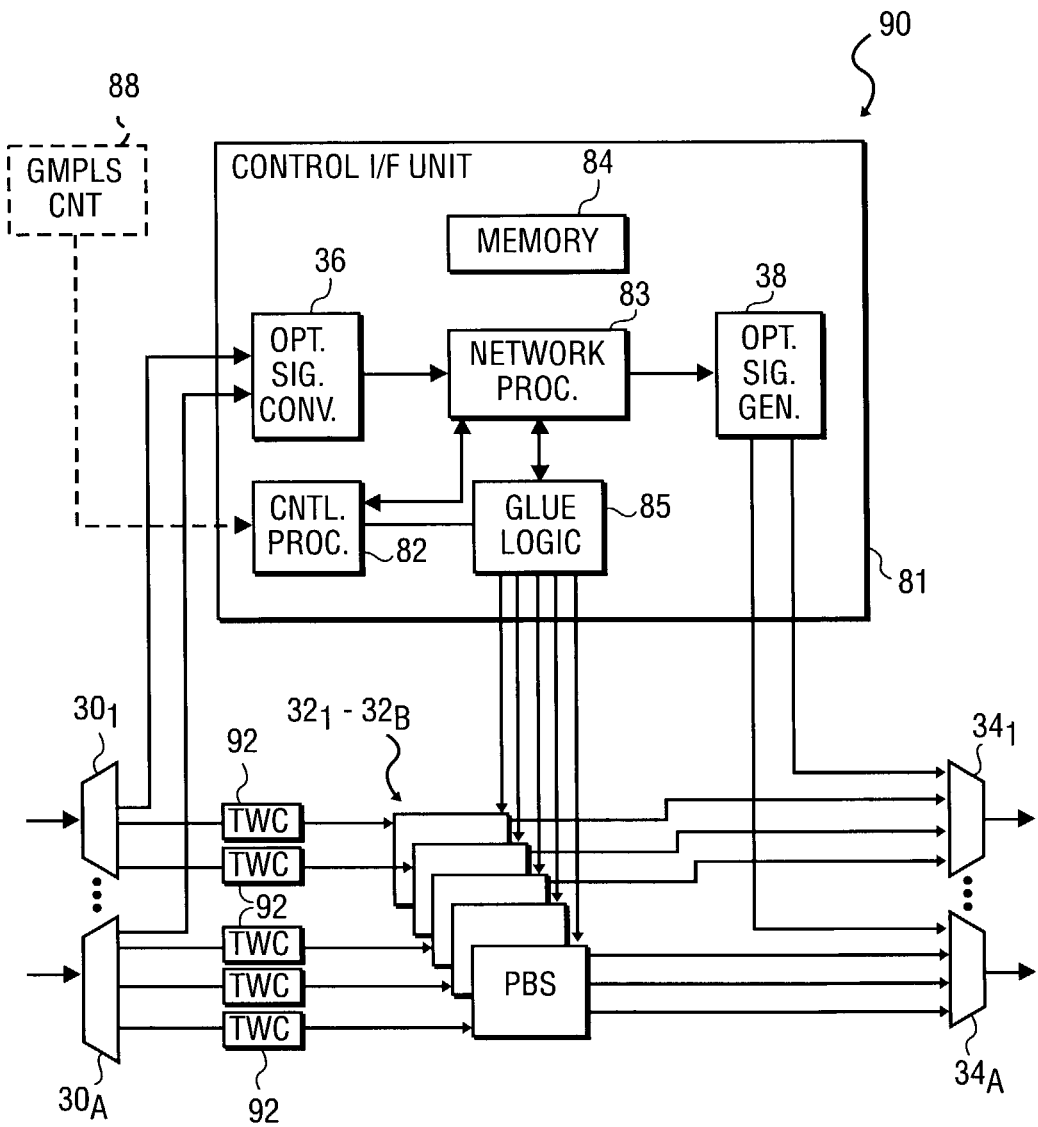
FIG. 9 is a block diagram illustrating a core switching node module with tunable wavelength conversion, according to one embodiment of the present invention.

FIG. 9 illustrates a core switching node module 90 with tunable wavelength converters, according to one embodiment of the present invention. This embodiment of module 90 is similar to the embodiment of module 17 (FIG. 8) except that module 90 does not have optical buffer 87, but does include tunable wavelength converters (TWCs) 92 connected between photonic burst switches $32_1$-$32_B$ and demultiplexers $30_1$-$30_A$. In addition, photonic burst switches $32_1$-$32_B$ provide at least one spare output port. As previously described, photonic burst switches $32_1$-$32_B$ provide N×N switching under the control of control interface unit 81.

In this embodiment, each of demultiplexers $30_1$-$30_A$ has each of its "optical payload" output leads connected to an input lead of a corresponding TWC 92. The output leads of the TWCs 92 are connected to photonic burst switches $32_1$-$32_B$. Thus, demultiplexers $30_1$-$30_A$ in this embodiment of module 90 are connected to photonic burst switches $32_1$-$32_B$ in the same manner as in module 17 (FIG. 8) except that in module 90 each of these connections is through a TWC. In addition, although not shown in FIG. 9 to avoid obscuring the drawing, each of TWCs 92 has a control port connected to control interface unit 81.

In basic operation, one embodiment of module 90 operates as follows. When there is no contention, module 90 operates as described above for module 17 (FIG. 8). However, when a variable-duration TDM channel is not available for a payload signal arriving at one of the input ports of module 90, control interface unit 81 will detect this condition.

In response, when data bursts of the incoming optical signal have not arrived yet at the photonic burst switches of module 90, control interface unit 81 changes the photonic burst switches $32_1$-$32_B$ configurations to switch the incoming optical payload signal to one of the spare output ports of photonic burst switches $32_1$-$32_B$. In addition, control interface unit 81 causes TWC 92 that receives this delayed optical payload signal to convert its wavelength to another available wavelength. Photonic burst switches $32_1$-$32_B$ are able to switch the "converted" optical payload signal within an available variable-duration TDM channel, thereby bypassing the "blocked" TDM channel. In one embodiment, the output converted payload signal can be converted back to the original wavelength at the next switching node when another variable-duration TDM channel becomes available. In another embodiment, another TWC (not shown) at the output ports of the photonic burst switches $32_1$-$32_B$ can be used at the same switching node to convert the converted payload signal back to the original wavelength.

However, in this embodiment module 90, if data bursts of the incoming optical signal have already arrived at the photonic burst switches when the contention condition is detected, these data bursts are dropped. In addition, in this embodiment, control interface unit 81 sends a network management message to the sending node to resend the dropped packets.

FIG. 10 illustrates a TWC 92 in a portion of module 90 (FIG. 9), according to one embodiment of the present invention. In this embodiment, this TWC 92 includes an optical coupler 100, a circulator 101, an optical delay 102, a tunable optical filter (TOF) 103, another optical coupler 104, a photodetector 105, an electronic buffer 106, a tunable laser 107 and a control processor 82.

In one embodiment, optical delay 102 is a fixed time-delay optical delay circuit. For example, optical delay 102 can be a Fabry-Perot etalon in a fixed delay embodiment. In other embodiments, optical delay 102 can be a variable time-delay optical circuit implemented with a set of different length optical fibers sandwiched between a fiber combiner and splitter.

Also, in this embodiment, TOF 103 is a tunable optical filter that is configured to either pass or reflect an optical signal of a selected wavelength in response to a control signal. In this embodiment, TOF 103 has a center wavelength (i.e., the wavelength that is reflected by the optical filter) that can be tuned. Thus, in the "pass" mode, TOF 103 would be tuned on a wavelength displaced from wavelength to be passed. In the "reflect" mode, TOF 103 would be tuned on the wavelength to be reflected. In other embodiments, TOF 103 may be implemented using other suitable circuits.

The elements of the TWC 92 shown in FIG. 10 are interconnected as follows. Coupler 100 has three ports: a first port connected to an output port of a demultiplexer (i.e., one of demultiplexers $30_1$-$30_A$ shown in FIG. 9); a second port connected to a port of circulator 101; and a third port connected to an output port of optical delay 102. Circulator 101 has three ports: one connected to an input port of optical delay 102, a second port connected to an input port of TOF 103, and a third port connected to coupler 100. More specifically, coupler 100 and circulator 101 are connected to pass a payload signal of wavelength $\lambda_1$ from the optical demultiplexer to TOF 103.

TOF 103 has an output port connected to a port of coupler 104. Coupler 104 has two other ports: one connected to an input port of photonic burst switches $32_1$-$32_B$, and another connected to receive an optical signal from tunable laser 107. Tunable laser 107 has a digital input port connected to an output port of buffer 106, which in turn has an input port connected to an output port of photo-detector 105. Photo-detector 105 is connected to receive an optical signal from one of the "spare" output ports of photonic burst switches $32_1$-$32_B$. Control processor 82 is connected to optical delay 102, TOF 103, buffer 106 and tunable laser 107 so that control processor 82 can control or monitor the operation of these elements. The operation of this portion of module 90 is described below in conjunction with FIG. 11.

Figure 11:
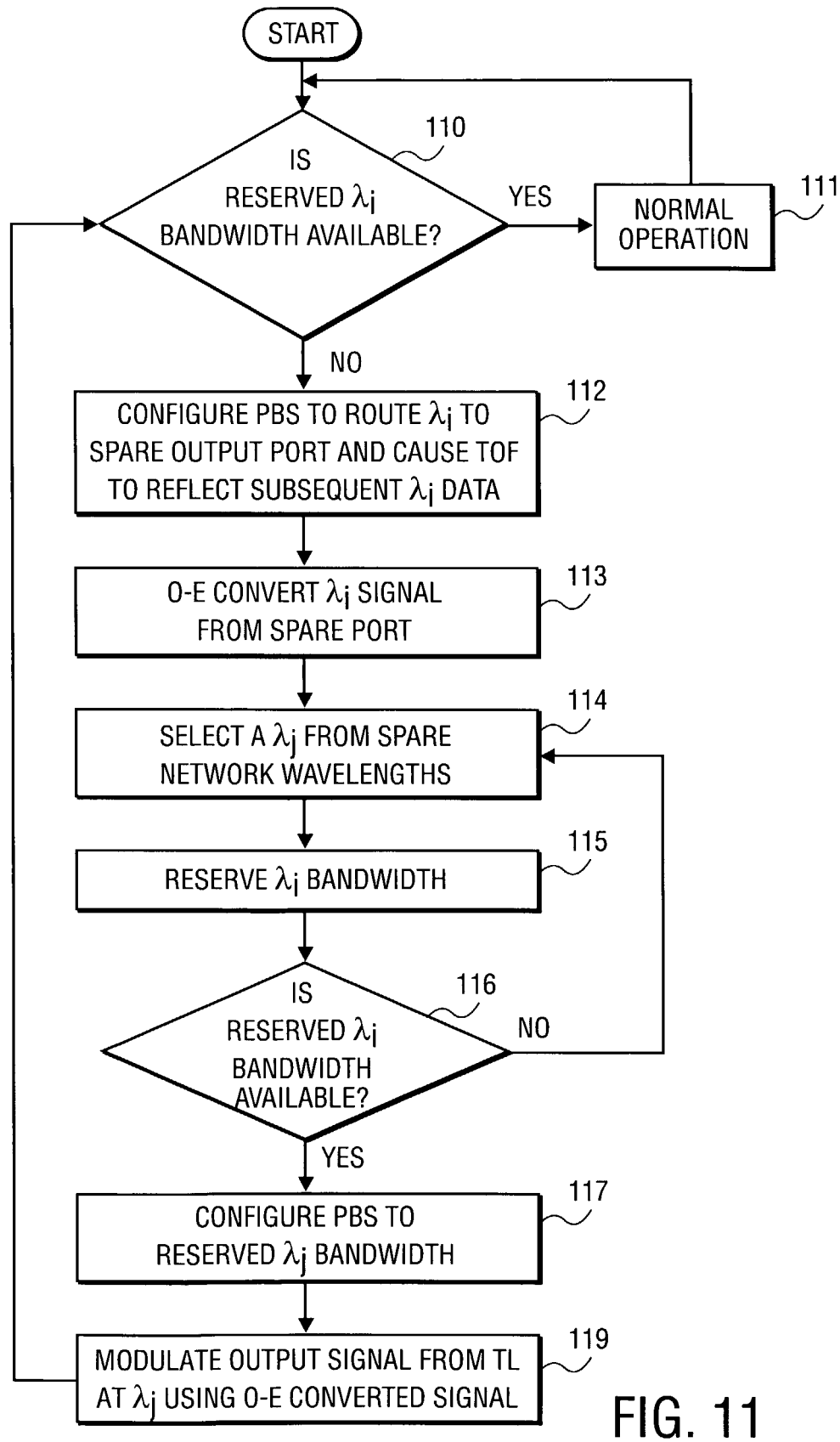
FIG. 11 is a flow diagram illustrating the operation of the core switching node module of FIG. 10, according to one embodiment of the present invention.

FIG. 11 illustrates the operational flow of a portion of module 90 (FIG. 10) having a TWC, according to one embodiment of the present invention. Although the operation with respect to only one TWC is described, the operation of module 90 with respect to the other TWCs is substantially similar. Referring to FIGS. 10 and 11, this embodiment of module 90 operates as follows.

During operation, module 90 monitors the availability of reserved bandwidth (e.g., a TDM channel) for wavelength $\lambda_1$. In one embodiment, network processor 83 (FIG. 9) monitors the availability of reserved bandwidth and passes this information to control processor 82. For example, if a received control burst contains information reserving a particular TDM channel, network processor 83 (FIG. 9) would then determine whether photonic burst switches $32_1$-$32_B$ are available to be configured to provide the reserved TDM channel. In other embodiments, control processor 82 performs this operation directly. For example, control processor 82 may be implemented by network processor 83 (FIG. 9). A block 110 represents this operation.

If the reserved variable duration TDM channel is available, module 90 operates as described above for module 17 (FIG. 8) to switch the payload signal to the reserved TDM channel. More specifically, the TWC 92 allows the incoming payload signal (i.e., at wavelength $\lambda_i$) to pass through to photonic burst switches $32_1$-$32_B$. Thus, in this embodiment, the payload signal passes through coupler 100 and circulator 101 to TOF 103, which is configured to pass the payload signal to the photonic burst switches so that the payload signal can be switched to the reserved TDM channel. A block 111 represents this operation.

However, if the variable duration TDM channel is not available in block 110, and no packets of the incoming optical payload signal have arrived yet at the photonic burst switches of module 90, photonic burst switches $32_1$-$32_B$ are configured to switch the incoming optical payload signal to one of the spare output ports of photonic burst switches $32_1$-$32_B$. In addition, TOF 103 is configured to reflect the incoming payload signal back to circulator 101. In this embodiment, control processor 82 configures the photonic burst switches and TOF 103.

As a result, a portion of the optical payload signal (within a specific TDM channel) is routed to the spare output port. Further, subsequent portions of the incoming payload signal are re-circulated by circulator 101 and optical delay 102. After delaying these portions of the incoming data burst signal, optical delay 102 directs the delayed portions to coupler 100, which then directs the delayed portions back to circulator 101. The delayed portions are then continually recirculated via circulator 101, optical delay 102 and coupler 100 until TOF 103 is tuned to pass $\lambda_i$ wavelength signals. A block 112 represents this operation.

However, as previously described, in some embodiments, if one or more packets of the incoming optical payload signal have already arrived at the photonic burst switches of module 90, the module drops these packets and sends a message to the sending node to resend the dropped packets.

The portion of the data burst signal routed to the spare output port is then converted to an electrical signal. In one embodiment, photo-detector 105 receives this portion of the optical payload signal and converts it to an electrical signal. The corresponding electrical signal is buffered by buffer 106, and then used to directly modulate tunable laser 107. A block 113 represents this operation.

A wavelength is then selected from spare network wavelengths. In this embodiment, spare wavelengths are set aside for use by any node in the network for special uses such as buffering and are not normally used for optical data bursts and control bursts. In this embodiment, control processor 82 selects a spare wavelength (indicated as wavelength $\lambda_j$) from the available spare wavelengths (which have wavelengths different from the wavelength of the payload signal). A block 114 represents this operation.

Bandwidth for the selected spare wavelength is reserved. In this embodiment, control processor 82 reserves the bandwidth (e.g., a variable duration TDM channel) by sending an optical control network management signal to other nodes in the network. When control processor 82 does not have enough time to select the spare wavelength and reserve the bandwidth before the optical data burst signal arrives, the data bursts are dropped (as previously described). In addition, in this embodiment, control interface unit 81 sends a network management control message to the sending node to resend the dropped data bursts. A block 115 represents this operation.

Module 90 monitors the availability of reserved bandwidth (e.g., a TDM channel) for the spare wavelength $\lambda_j$ in a similar manner to the operation described for block 110. A block 116 represents this operation.

The photonic burst switches are then configured to switch the spare wavelength signal to the reserved bandwidth. In this embodiment, control processor 82 configures photonic burst switches $32_1$-$32_B$ to switch the spare wavelength $\lambda_j$ to the reserved bandwidth (i.e., variable-duration TDM channel). A block 117 represents this operation.

An optical signal of a wavelength $\lambda_j$ is then modulated to contain information from the electrical signal generated by photo-detector 105. In one embodiment, tunable laser 107 receives the electrical signal generated by photo-detector 105 via buffer 106, which the tunable laser then uses (as described above) to modulate an output optical signal having a wavelength $\lambda_j$. Coupler 104 receives and directs this signal back to photonic burst switches $32_1$-$32_B$. As previously described in conjunction with FIG. 9, the photonic burst switches are configured to route this new wavelength signal within an available variable-duration TDM channel, thereby avoiding a contention problem. In such embodiments, the network has one or more spare wavelengths that can be used throughout the network. A block 119 represents this operation. After transmission of the $\lambda_j$ data, the operational flow returns to block 110.

This embodiment has several advantages. For example, the use of TWC 92 provides an additional degree of freedom in avoiding possible traffic contention problems. In addition, the portions of the $\lambda_i$ wavelength payload signal that are received after the photonic burst switches are configured to route $\lambda_j$ wavelength signals are diverted to an optical delay and, thus, are not lost.

Figure 12:
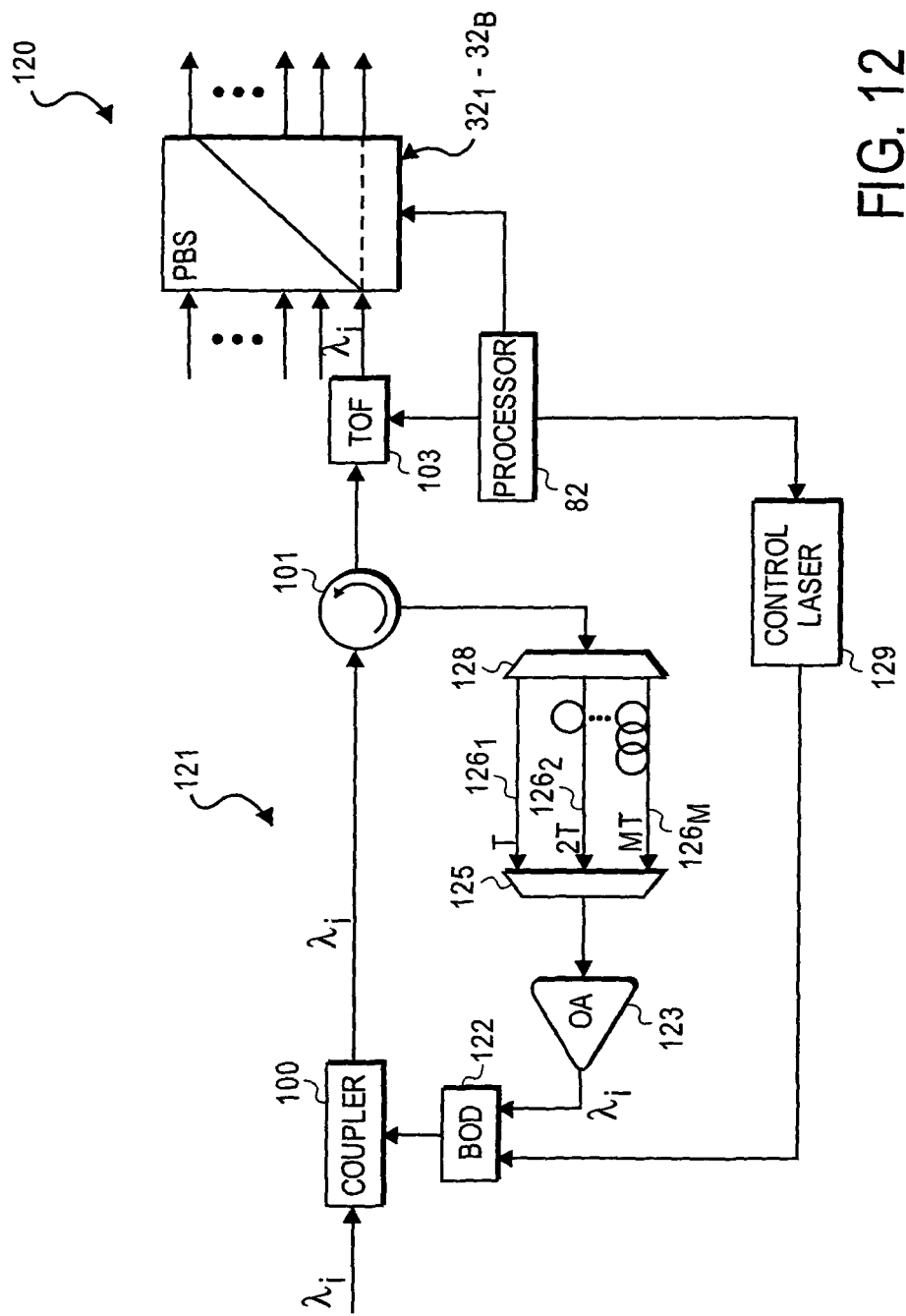
FIG. 12 is a block diagram illustrating a core switching node module with a variable delay optical buffer, according to one embodiment of the present invention.

FIG. 12 illustrates a portion of a core switching node module 120 with a variable time-delay optical buffer, according to one embodiment of the present invention. In this embodiment, module 120 is substantially similar to module 90 (FIGS. 9 and 10) except that module 120 includes a variable time-delay optical buffer (VDOB) 121 instead of a TWC. In addition, other input ports of photonic burst switches $32_1$-$32_B$ have VDOBs (not shown) that are substantially similar to VDOB 121. In one embodiment, VDOB 121 includes coupler 100, circulator 101, TOF 103 and control processor 82 as in TWC 92 (FIG. 10). In addition, VDOB 121 includes a bistable optical device (BOD) 122, an optical amplifier 123, an optical combiner 125, optical delay lines $126_1$-$126_M$, an optical splitter 128, and a laser 129.

In this embodiment, BOD 122 is a gating device that outputs an optical signal only when the intensity of its input signal(s) exceeds a threshold intensity level. Such devices are known in the relevant art. For example, an InGaAsP/InP multiple quantum well (MQW) material sandwiched in a Fabry-Perot etalon can operate with nanosecond switch on and off times at room temperature and a relatively low input power.

The elements of this embodiment of VDOB 121 are interconnected as follows. Coupler 100 has three ports: a first port connected to an output port of a demultiplexer (e.g., such as one of demultiplexers $30_1$-$30_A$ shown in FIG. 9); a second port connected to an output port of BOD 122; and a third port connected to a port of circulator 101. Circulator 101 has two other ports: one connected to an input port of optical splitter 128 and another connected to an input port of TOF 103. More specifically, coupler 100 and circulator 101 are connected to pass a payload signal of wavelength $\lambda_1$ from the optical demultiplexer to TOF 103.

Optical splitter 128 has M output ports connected to M input ports of optical combiner 125 via optical delay lines $126_1$-$126_M$. In this embodiment, optical delay lines $126_1$, $126_2$, ... , and $126_M$ respectively provide delay times of T, 2T, ..., and MT. In other embodiments, the optical delay lines may provide a non-uniform distribution of delay times. In one embodiment, optical delay lines $126_1$-$126_M$ are implemented with optical fibers of different lengths. The output port of optical combiner 125 is connected to an input port of optical amplifier 123, which has an output port connected to one of two input ports of BOD 122. The other input port of BOD 122 is connected to receive an optical signal generated by a control laser 129. Control processor 82 is connected to TOF 103, photonic burst switches $32_1$-$32_B$, and to control laser 129 so that control processor 82 can control or monitor the operation of these elements. The operation of this portion of module 120 is described below in conjunction with FIG. 13.

Figure 13:
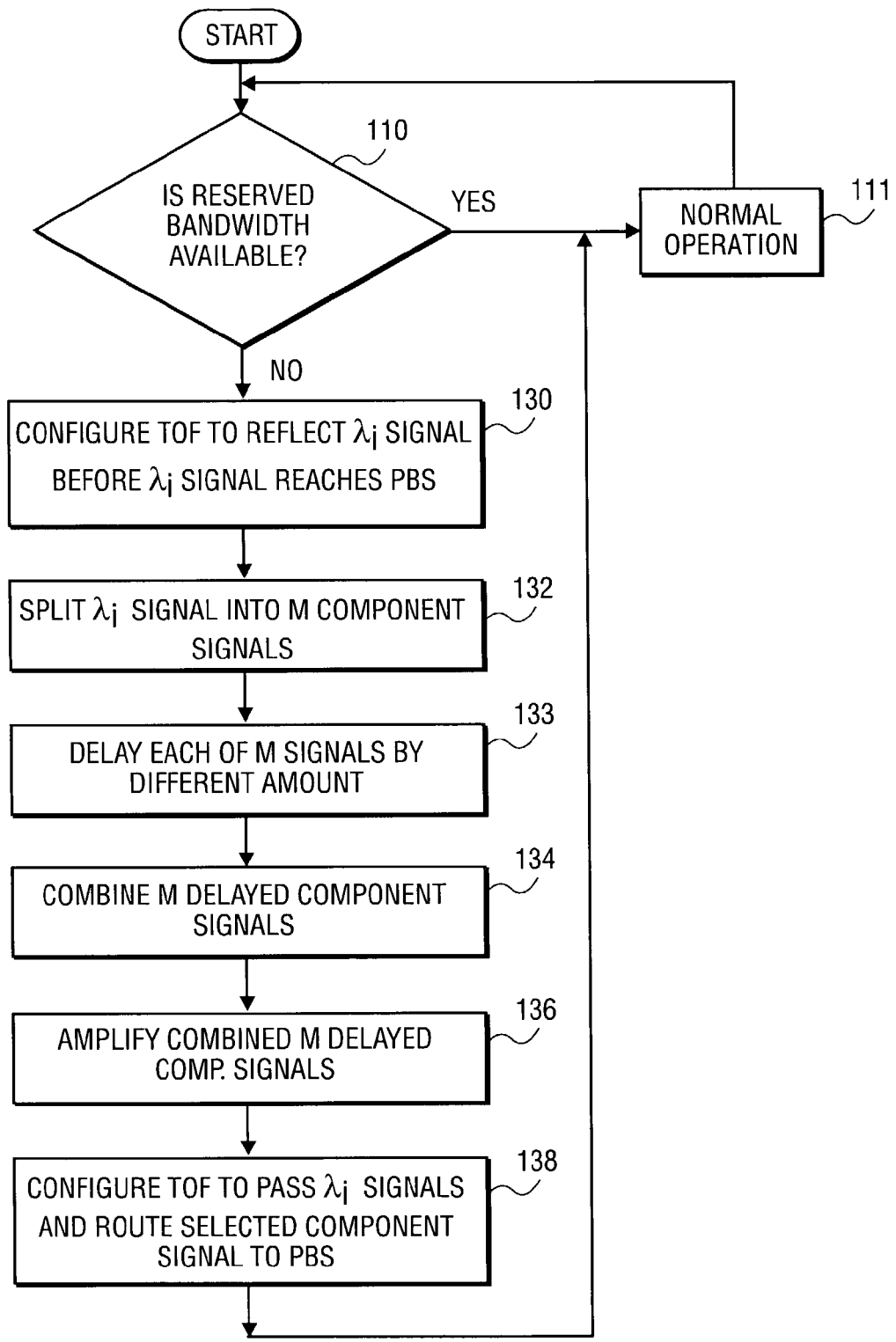
FIG. 13 is a flow diagram illustrating the operation of the core switching node module of FIG. 12, according to one embodiment of the present invention.

FIG. 13 illustrates the operational flow of a portion of module 120 (FIG. 12) having a VDOB, according to one embodiment of the present invention. Although the operation with respect to only one VDOB is described, the operation of module 120 with respect to the other VDOBs is substantially similar. Referring to FIGS. 12 and 13, this embodiment of module 120 operates as follows.

During operation, module 120 monitors the availability of reserved bandwidth (e.g., a TDM channel). In one embodiment, network processor 83 (FIG. 9) monitors the availability of reserved bandwidth and passes this information to control processor 82. For example, if a received control burst contains information reserving a particular TDM channel, network processor 83 (FIG. 9) would then determine whether photonic burst switches $32_1$-$32_B$ are available to be configured to provide the reserved TDM channel. In other embodiments, control processor 82 performs this operation directly. For example, control processor 82 may be implemented by processor 83 (FIG. 9). Block 110 represents this operation.

If the reserved variable duration TDM channel is available, module 120 operates as described above for module 17 (FIG. 8) to switch the payload signal within the reserved TDM channel. More specifically, the incoming optical payload signal (i.e., at wavelength $\lambda_i$) passes through coupler 100 and circulator 101 to TOF 103, which is configured to pass the incoming optical payload signal to photonic burst switches $32_1$-$32_B$ so that the incoming optical data burst signal can be switched to the reserved variable duration TDM channel. Block 111 represents this operation.

However, if the variable-duration TDM channel is not available, the incoming optical data burst signal is reflected so that it does not reach the input ports of the photonic burst switches. In one embodiment, TOF 103 is configured to reflect the incoming payload signal back to circulator 101. In this embodiment, control processor 82 configures the photonic burst switches and TOF 103. A block 130 represents this operation.

However, if one or more data bursts of the incoming optical data burst signal have already arrived at the input ports of the photonic bur switches before TOF 103 can be configured to reflect them, module 120 drops these data bursts and sends a network management control message to the sending node to resend the dropped data bursts.

The reflected data burst signal is then split into M component signals. In this embodiment, each of the component signals has essentially the same energy and phase. In this embodiment, optical splitter 128 receives the data burst signal reflected by TOF 103 via circulator 101 and then splits this signal into M "equal" optical power component signals. A block 132 represents this operation.

The M component signals are then delayed, each by a different amount of time. In this embodiment, as previously described, optical delay lines $126_1$-$126_M$ provide delays of T, 2T, . . . , and MT to the M component signals. A block 133 represents this operation.

The delayed component signals are then combined. In this embodiment, optical combiner 125 combines the M component signals received from optical delay lines $126_1$-$126_M$. The duration of T is selected in one embodiment to be longer than a given minimum optical data burst duration at a given wavelength (which typically depends on many parameters such as the specific traffic pattern, PBS network topology, number of wavelengths, etc.). In this way, the delayed component signals will not overlap when combined by optical combiner 125. A block 134 represents this operation.

The combined signal is then amplified. In this embodiment, optical amplifier 123 amplifies the combined signal.

Any suitable optical amplifier can be used to implement optical amplifier 123. For example, a semiconductor optical amplifier (SOA) can be used. A block 136 represents this operation.

TOF 103 is then configured to pass signals of wavelength $\lambda_i$ and a selected component signal of the amplified combined signal is routed to the photonic burst switches. In one embodiment, control processor 82 controls TOF 103 to pass $\lambda_i$ wavelength signals and causes control laser 129 to output an optical signal to BOD 122. The intensity of the control laser signal is selected so that when combined with the output signal from optical amplifier 123, BOD 122 will, in effect, switch on and output the signal from optical amplifier 123, is transmitted through coupler 100.

Further, in this embodiment, control processor 82 calculates the required delay time for the TDM channel to become available and then selects which of the M delayed component signals is sufficiently delayed so as to be available when the TDM channel becomes available. Control processor 82 then causes control laser 129 to generate its laser output signal so that BOD 122 will "gate" on and off the selected delayed component signal from optical amplifier 123 to coupler 100. A block 138 represents this operation. The operational flow then returns to block 111 (described previously in conjunction with FIG. 11).

Figure 14:
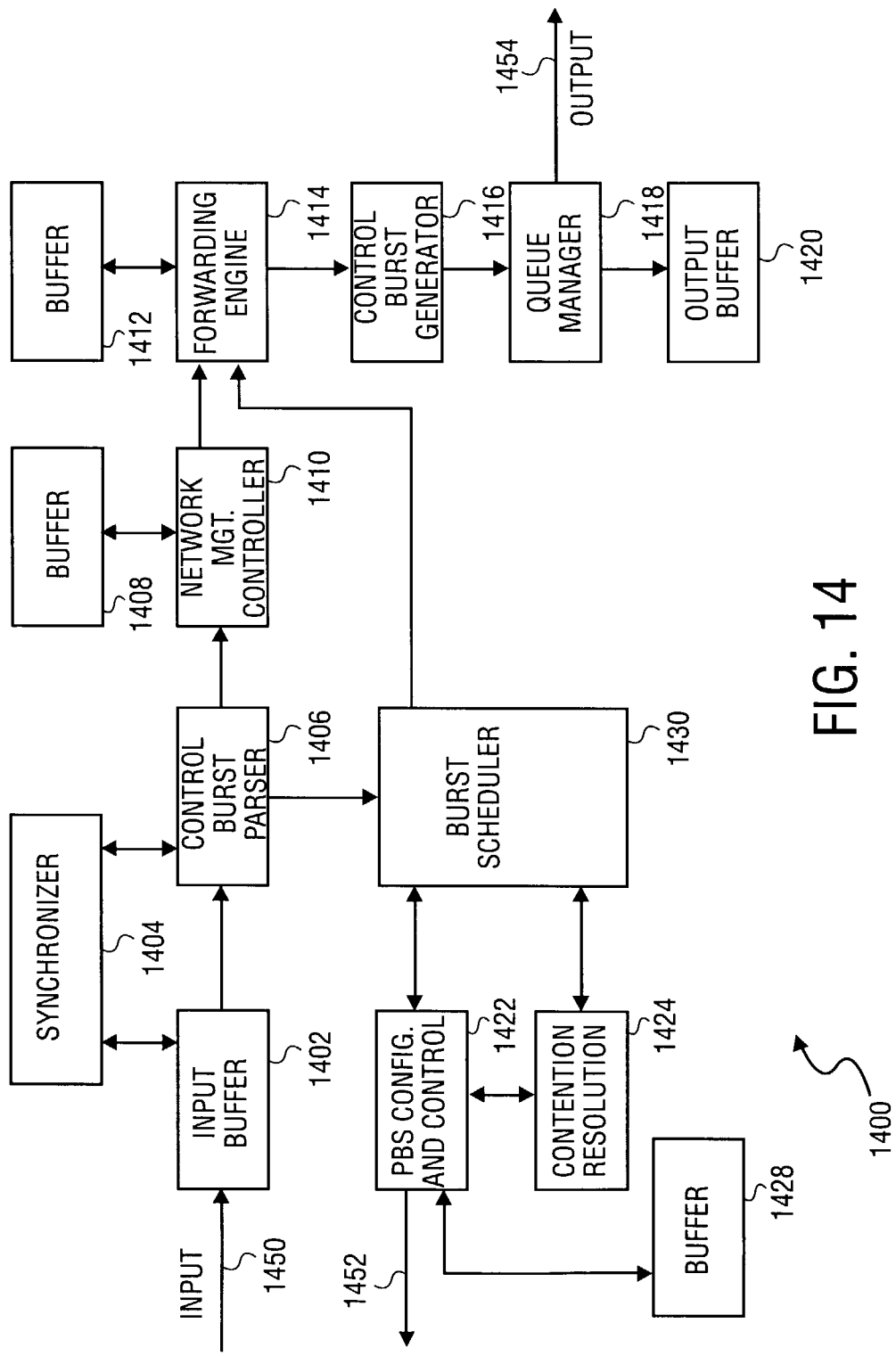
FIG. 14 is a simplified block diagram architecture of the control burst processing unit, according to one embodiment of the present invention.

FIG. 14 illustrates a control burst processing unit 1400, according to one embodiment of the present invention. The control burst processing unit 1400 may in one embodiment be utilized generally as a network processor 83 and/or as a control processor 82 of FIGS. 8 and 9. In one embodiment the time slots mentioned below may be variable-duration TDM channels. In another embodiment, the time slots may be fixed-duration TDM channels.

The control burst processing unit 1400 may receive control bursts in electronic form on input 1450 connected to input buffer 1402. In one embodiment the control bursts may be presented in the optical control burst format of FIG. 4B. The control bursts may then be processed in the control burst parser 1406. In one embodiment, the control burst parser 1406 may deframe the incoming control bursts, and then parse the control bursts. In one embodiment, the parsing may take the form of extracting the type of message information from the optical control burst of FIG. 4B. The control burst information may include the data burst size, burst start and arrival times, arrival wavelength, source and destination addresses, forward equivalent class (FEC), burst priority, control burst offset time, and other relevant routing information. In another embodiment, the control burst parser 1406 may classify the incoming control bursts based on the extracted information before sending them to burst scheduler 1430.

In another embodiment, the control burst parser 1406 may additionally perform a cyclic redundancy check (CRC) on the incoming control burst. If the CRC fails on a particular control burst, then the control burst parser 1406 may generate a negative acknowledgement (NACK) for transmission back to the originator of the photonic control and data bursts. Such an originator may in one embodiment be an ingress switching node 15 of FIG. 1. The originator upon receiving a NACK may then retransmit the failing control burst. In one embodiment the NACK may be in the format of the control network management label discussed in connection with FIG. 4B above.

In one embodiment a synchronizer 1404 may be connected to the input buffer 1402 and control burst parser 1406. Synchronizer 1404 may determine the synchronization of control bursts by examining the time stamp within the control burst and comparing it to a local clock. Synchronizer 1404 may then maintain synchronization between the incoming control bursts and the newly-generated outgoing control bursts.

Another function of the synchronizer 1404 may in one embodiment be to maintain synchronization with neighboring core switching nodes. In one embodiment such synchronization may be maintained by sending special sync messages to the neighboring core switching nodes. The neighboring core switching nodes may respond to the special sync messages by returning an acknowledgement message.

Finally, in one embodiment synchronizer 1404 may assist in initializing optical MAN 11 of FIG. 1. It may do this by initializing and maintaining synchronization of control burst processing unit 1400 with the routers on the edges of optical MAN 11, such as ingress switching node 15 or egress switching node 18. Such routers on the edge of optical MAN 11 may be generally called "edge routers".

Burst scheduler 1430 may schedule the transmission of data bursts to the next core switching node. It may first determine the PBS $32_1$-$32_B$ configuration settings for the requested wavelength and variable duration TDM channels. Then burst scheduler 1430 may transmit the requested PBS configuration settings to the PBS configuration and control module 1422. In one embodiment, PBS configuration and control module 1422 may simply check if the appropriate PBS $32_1$-$32_B$ configuration settings are permitted and available within the requested variable duration TDM channels and wavelength (i.e., there is no contention for this configuration). Switch control signal 1452 may be used in one embodiment to control the configuration of the PBS $32_1$-$32_B$. PBS configuration and control module 1422 may in one embodiment send an acknowledgement message to burst scheduler 1430, confirming the requested PBS configuration settings.

However, there may be situations when the PBS configuration and control module 1422 determines that the requested PBS $32_1$-$32_B$ configuration settings for the requested wavelength and variable duration TDM channels may not be available for the given data burst. In this case PBS configuration and control module 1422 may send a NACK message to burst scheduler 1430. In one embodiment, the NACK message may be a control network management label as discussed above in connection with FIG. 4B. In one embodiment PBS configuration and control module 1422 may examine the NACK message and determine whether the non-availability is caused by the PBS $32_1$-$32_B$ failure (i.e., non-contention related failure such as power or software failure), or it is caused by contention with another data burst. If the non-availability of the requested PBS $32_1$-$32_B$ configuration settings for the requested wavelength and variable duration TDM channels is caused by a failure in a PBS $32_1$-$32_B$, then the burst scheduler 1430 may generate a network management control message to the originating edge router requesting a retransmission using a different OLSP, bypassing the failed PBS node.

If the non-availability of the requested PBS $32_1$-$32_B$ configuration settings for the requested wavelength, and the variable duration TDM channels is caused by a contention with other data bursts, then burst scheduler 1430 may utilize a contention resolution block 1424 to determine an alternate path to the requested PBS $32_1$-$32_B$ configuration settings for the requested wavelength and variable duration TDM channels for the specified data burst.

Contention resolution block 1424 may in certain embodiments implement various methods or combinations of methods for resolving contentions for resources between data bursts. In one embodiment, contention resolution block 1424 may task PBS configuration and control module 1422 to switch in a fiber optic delay line in one of the requested input port to output port connections. The use of the fiber optic delay line may then shift the transmission of one of the data bursts to a later time when no contention exists. In one embodiment the fiber optic delay line may be implemented using the VDOB 121 of the FIG. 12 embodiment.

In another embodiment, contention resolution block 1424 may task PBS configuration and control module 1422 to switch in a wavelength conversion module in one of the requested PBS $32_1$-$32_B$ configuration settings. The use of the wavelength conversion module may then shift the transmission of one or more data bursts to a different wavelength where no contention exists. In one embodiment the wavelength conversion module may be implemented using the TWC 92 of the FIG. 19 embodiment.

In a third embodiment, contention resolution block 1424 may task PBS configuration and control module 1422 to switch the data burst to an alternate core switching node than the next core switching node on the preferred OLSP. Contention resolution block 1424 may then send a message to the burst scheduler 1430 to initiate the sending of a new control burst to that alternate core switching node, requesting subsequent data burst routing back to the instant sending node. This sending of the control burst and data burst to the alternate core switching node and then back again may be called deflection routing. Deflection routing is one method of adding time delay and thereby resolving the contention for PBS $32_1$-$32_B$ configuration settings for the requested wavelength and variable duration TDM channels.

In a fourth embodiment, contention resolution block 1424 may resolve contention between two or more data bursts for PBS $32_1$-$32_B$ configuration settings for the requested wavelength and variable duration TDM channels by dropping the data bursts, and requesting the sourcing edge router to retransmit that control burst and data burst at a later time. Contention resolution block 1424 may in one embodiment task PBS configuration and control module 1422 to switch the data burst to an inactive or internally connected port. Then the contention resolution block 1422 may initiate the transmission of a NACK message to the sourcing edge router. The sourcing edge router may then respond by retransmitting the control burst and data burst from a backup copy kept in a queue.

As part of this fourth embodiment, contention resolution block 1424 may determine which of two data bursts that are in contention should be retransmitted. In one embodiment contention resolution block 1424 may make this determination based upon the relative priorities of the two data bursts. Contention resolution block 1424 may determine the relative priorities of the two data bursts either explicitly or implicitly. In one embodiment, information about explicit priorities may be encoded in the control bursts. This information may be decoded by control burst parser 1406 and delivered to contention resolution block 124 via burst scheduler 1430. In another embodiment, contention resolution block 1424 may apply rules to determine implicitly the relative priorities of two data bursts. For example, the data burst of the largest size may be determined to have the highest relative priority. There is generally a basic time offset between the control burst and the data burst, and an additional time offset that in one embodiment may be assigned, for example, to the data burst with higher relative priority. In some embodiments the additional time offset may be assigned in part by considerations of data burst size and probabilities of successful transmission from ingress switching node to egress switching node. There may also be implicit priorities in the assignment of specific wavelengths, fibers, or other parameters. For example, one particular wavelength $\lambda_A$ may be assigned to carry delaysensitive data burst transmissions. Contention resolution block 1424 may use these or other rules, either by themselves or in combination, to make an implicit determination of relative priorities between two data bursts. In other embodiments, other modules within control burst processing unit 1400 may determine or aid in the determination of the relative priorities of two data bursts.

In one embodiment the network management controller 1410 may be responsible for acting on the PBS network configuration messages exchanged among the various edge routers and core switching nodes. As part of this functionality, network management controller 1410 may maintain a lookup table of current status, including list of the available variable duration TDM channels, source and destination addresses, wavelength usage, overall network traffic conditions, and updated status of available network resources. Network management controller 1410 may also control the filling of the input buffer 1402 by sending a NACK back to the sourcing edge router.

The forwarding engine 1414 may gather the necessary control information produced in the network management controller 1410, burst scheduler 1430, and contention resolution block 1424. The forwarding engine in one embodiment may select the next core switching node through which to route the control and data bursts. This selection may be based in part upon destination address information within the control burst concerning the label-switched path (LSP). The forwarding engine 1414 may also perform control label swapping. Control label swapping (routing information on a given wavelength for the next switching node) may be based upon updated destination addresses, the PBS output port, and the selected wavelength.

Using information presented by the forwarding engine 1414, the control burst generator 1416 in one embodiment produces the new outgoing control bursts as established by the burst scheduler 1430. The control burst generator may also produce the control bursts for any PBS network configuration messages produced by the network management controller 1410.

Finally, a queue manager 1418 may produce a time sequenced output stream of new control bursts. The outgoing control bursts may be sorted according to their relative priorities, destination addresses, and other network management priorities. During times of high traffic load, queue manager 1418 may place lower-priority control bursts and network management labels into an output buffer 1420 for temporary storage. In other embodiments, control bursts with a relatively longer time offset between control burst and data burst may also be stored within output buffer 1420 when required.

In some embodiments, the functional blocks of control burst processing unit 1400 may be implemented in dedicated logic. However, in other embodiments the functional blocks may be implemented using one or more processing units of a group of otherwise undifferentiated and similar processing units.

Figure 15:
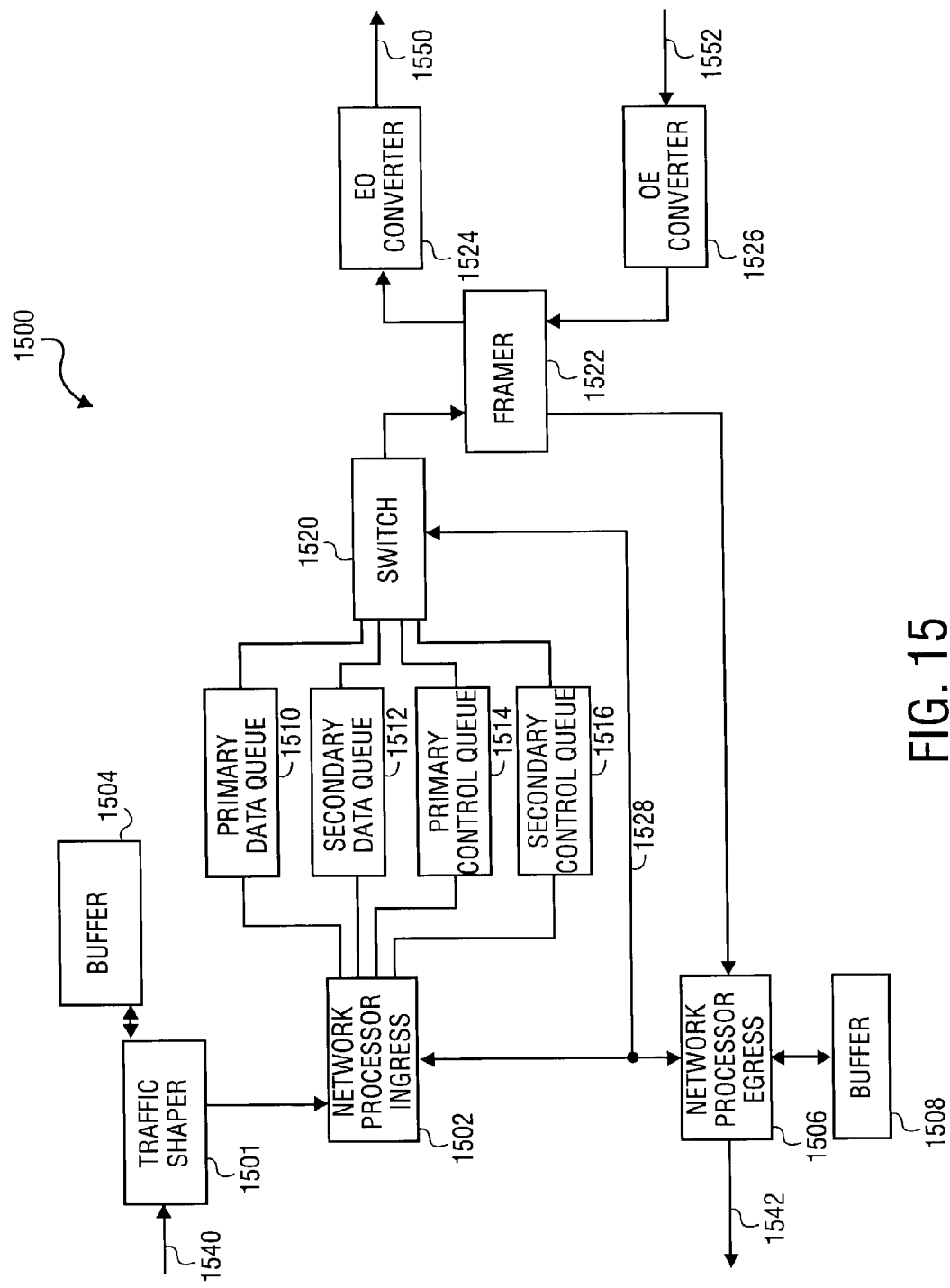
FIG. 15 is a simplified block diagram architecture of certain portions of an edge router, showing various features such as a traffic shaper and multiple queues, according to one embodiment of the present invention.

FIG. 15 is a simplified block diagram architecture of certain portions of an edge router 1500, showing various features such as a traffic shaper 1501 and multiple queues 1510, 1512, 1514, 1516, according to one embodiment of the present invention. As mentioned previously, the edge router 1500 may be an ingress switching node 15 or an egress switching node 18 of the FIG. 1 embodiment. The edge router 1500 may be used to support retransmission of control and data bursts as discussed above in connection with FIG. 14.

IP packets from multiple users and/or sources may arrive on signal line 1540 for the traffic shaper module 1501. The IP packets may be buffered in buffer 1504 as necessary. The traffic shaper 1501 may be used before the incoming IP packets are assembled to reduce or eliminate the traffic correlation structure and degree of self-similarity. Thus, traffic burstiness reduction may improve contention resolution at the switching nodes and traffic performance. In one embodiment, the IP packets may be assembled into IP payload data 41 and label data 47 within data bursts and control bursts, respectively, by network processor ingress module 1502. The network processor ingress module 1502 may then place the data bursts and control bursts in transmission order into the primary data queue 1510 and primary control queue 1514. The outputs of the queues may be selected by a switch 1520 for transmission via framer 1522. Leaving the framer 1522 in electrical format, the data and control bursts may enter the optical MAN via the electrical to optical converter 1524.

Data arriving from the optical MAN may enter edge router 1500 via an optical to electrical converter 1526. Once the data and control bursts are available to the framer 1522 in electrical format, the framer 1522 may supply them to network processor egress module 1506 where they are disassembled into IP packets.

In order to more conveniently provide for the retransmission of data and control bursts upon request, edge router 1500 may also contain a secondary data queue 1512 and secondary control queue 1516. The secondary data queue 1512 and secondary control queue 1516 may contain backup copies of data and control bursts. These backup copies may be needed when the copies of the data and control bursts within primary data queue 1510 and primary control queue 1514 may be deleted upon successful transmission of the data bursts.

Figure 16:
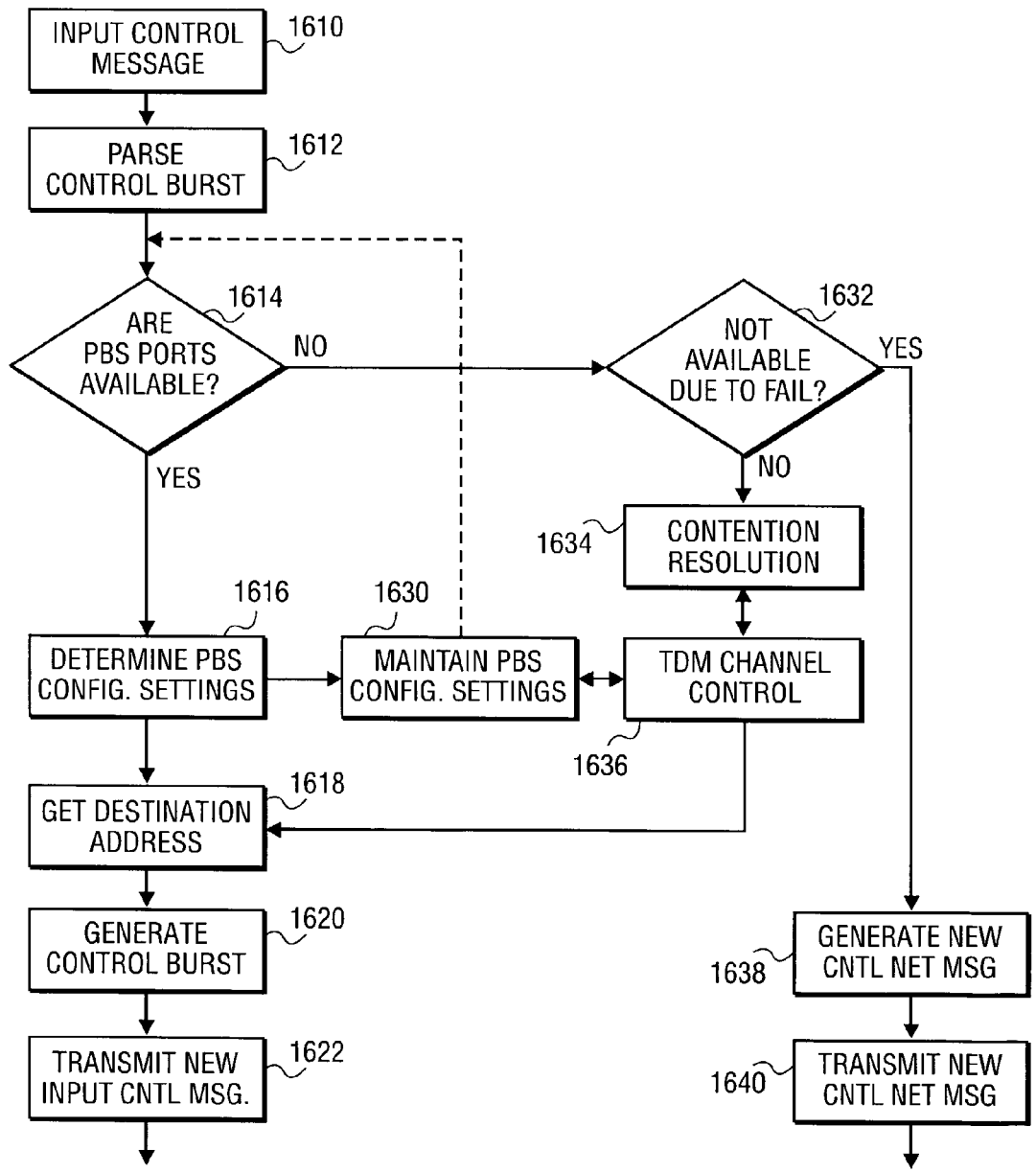
FIG. 16 is a flow diagram illustrating the operation of the control burst processing unit of FIG. 14, according to one embodiment of the present invention.

FIG. 16 is a flow diagram illustrating the operation of the control burst processing unit of FIG. 14, according to one embodiment of the present invention. The process begins with the receipt of a control burst in block 1610. The control burst may be parsed and classified into pieces of control information in block 1612, including the input port to output port connection, wavelength, and variable duration TDM channels allocated for transmission to the next core switching node. This control information may be used in decision block 1614 to determine whether the PBS ports are available for the specified input port to output port connection, wavelength, and variable duration TDM channels. If the PBS ports are available, then the process advances to block 1616 where the PBS configuration is determined for the requested variable duration TDM channels. The output of block 1616 may be used to maintain the PBS configuration settings in block 1630, which may be supplied to decision block 1614.

If, however, the PBS ports are not available, then decision block 1614 exits to decision block 1632. In decision block 1632 it is determined whether the non-availability of the PBS ports is due to an equipment failure. If so, then the process proceeds to block 1638 where a NACK or other similar control network message is produced for transmission, in block 1640, back to the originating edge router. If not, then the process enters the contention resolution block 1634.

In contention resolution block 1634, various methods of resolving the resource contention between the present data burst and another data burst may be performed. Among them are the time delay, wavelength shift, deflection routing, and retransmission methods discussed above in connection with FIG. 14. In some of these embodiments, contention resolution block 1634 may enter block 1638 to generate a control network management message. In some embodiments, contention resolution block 1634 may utilize the synchronization provided by TDM channel control in block 1636. In some cases a new variable duration TDM channel(s) may be chosen due to delays induced in the contention resolution. (For this reason TDM channel control block 1636 and maintain PBS configuration settings block 1630 may exchange information.)

Whether the process exits through determine PBS configuration settings block 1616 or through TDM channel control block 1636, the process then proceeds to get the destination address in block 1618. The destination address may in one embodiment be determined by a forwarding address table. In some embodiments the forwarding table may be updated by a network management controller. After obtaining the destination address, the process then proceeds to the generation of the new control burst in block 1620. Once the new control burst is generated, then in block 1622 it can be queued and transmitted to the next core switching node.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
a parser to deframe an incoming control burst;
a scheduler coupled to said parser to schedule a configuration of a photonic burst switch ("PBS") and a variable duration time division multiplexing channel to transmit a data burst corresponding to said incoming control burst, the variable duration time division multiplexing channel comprising a plurality of time slots, each time slot comprising a duration that can be different from at least one other time slot;
a contention resolution block coupled to said scheduler to determine an alternate routing of said data burst when said scheduler determines a resource contention of said PBS; and
a PBS configuration and control module coupled to said scheduler to configure the PBS in response to said scheduler, the PBS configuration and control module further coupled to the contention resolution block to configure the PBS in response to the contention resolution block to route the data burst according to the alternate routing when the resource contention occurs.

2. The apparatus of claim 1, wherein said contention resolution block is to set up a path on an alternate wavelength for said data burst.

3. The apparatus of claim 2, wherein said path is through a tunable wavelength converter.

4. The apparatus of claim 1, wherein said contention resolution block is to set up a path with a time delay for said data burst.

5. The apparatus of claim 4, wherein said path is through a variable time-delay optical buffer.

6. The apparatus of claim 4, wherein said path is to and back from a core switching node.

7. The apparatus of claim 1, wherein said contention resolution block is to set up alternate routing by requesting a retransmission of said data burst from an originating edge router.

8. The apparatus of claim 7, wherein said contention resolution block is to request retransmission when said data burst has a lower relative priority to another data burst.

9. The apparatus of claim 8, wherein said contention resolution block is to determine said lower relative priority by determining a size of said data burst from said incoming control burst.

10. The apparatus of claim 8, wherein said contention resolution block is to determine said lower relative priority by determining a time offset of said data burst from said incoming control burst.

11. The apparatus of claim 1, comprising a network management controller to maintain a list of available time domain multiplexing channels and wavelengths.

12. The apparatus of claim 1, comprising a synchronizer to send a sync message to a remote core switching node.

13. The apparatus of claim 1, wherein said parser, said scheduler, and said contention resolution block are implemented on processors selected from a set of processors.

14. A system, comprising:
a parser to deframe an incoming control burst;
a scheduler coupled to said parser to schedule a configuration of a photonic burst switch ("PBS") and a variable duration time domain multiplexing channel to transmit a data burst corresponding to said incoming control burst, the variable duration time division multiplexing channel comprising a plurality of time slots, each time slot comprising a duration that can be different from at least one other time slot;
a contention resolution block coupled to said scheduler to determine an alternate routing of said data burst when said scheduler determines a resource contention of said PBS;
a PBS configuration and control module coupled to said scheduler and to said PBS to configure the PBS in response to said scheduler, the PBS configuration and control module further coupled to the contention resolution block to configure the PBS in response to the contention resolution block to route the data burst according to the alternate routing when the resource contention occurs; and
an edge router including a first queue to transmit a set of data bursts and a second queue to maintain a copy of said set of data bursts.

15. The system of claim 14, wherein said contention resolution block is to set up alternate routing by requesting a retransmission of said data burst from said edge router.

16. The system of claim 15, wherein said contention resolution block is to request retransmission when said data burst has a lower relative priority to another data burst.

17. The system of claim 15, wherein said edge router is to retransmit said data burst from said second queue.

18. A method, comprising:
maintaining a listing of available variable duration time division multiplexing channels and transmission wavelengths, the variable duration time division multiplexing channels and transmission wavelengths being part of a photonic burst-switch network, the variable duration time division multiplexing channels comprising a plurality of time slots, each time slot comprising a duration that can be different from at least one other time slot;
parsing a control burst to deframe control information, the control burst being received from a node of the photonic burst-switched network;
determining on the basis of said control information and said listing whether a first data burst corresponding to said control burst would be in contention with a second data burst;
if there is contention, then resolving the contention between said first data burst and said second data burst, wherein said resolving includes converting the first data burst to a transmission wavelength selected from spare transmission wavelengths set aside for use during contentions between data bursts and not normally used for optical data bursts and control bursts, or dropping one or more data bursts based at least in part on relative priority or wavelength, or combinations thereof; and scheduling transmission of said first data burst based upon said control information and results of said resolving.

19. The method of claim 18, wherein said resolving includes changing a transmission wavelength for said first data burst.

20. The method of claim 18, wherein said resolving includes inserting a time delay for said first data burst.

21. The method of claim 18, wherein said resolving includes sending said first data burst to a core switching node of the photonic burst-switching network.

22. The method of claim 18, wherein said resolving includes requesting retransmission of said first data burst when said first data burst has a lower relative priority to said second data burst.

23. The method of claim 18, wherein said parsing includes classifying said control information.

24. An apparatus, comprising:
means for maintaining a listing of available variable duration time division multiplexing channels and transmission wavelengths, the variable duration time division multiplexing channels comprising a plurality of time slots, each time slot comprising a duration that can be different from at least one other time slot;
means for parsing a control burst to deframe control information;
means for determining on the basis of said control information and said listing whether a first data burst corresponding to said control burst would be in contention with a second data burst;
means for resolving contention between said first data burst and said second data burst, wherein said means for resolving contention includes means for converting the first data burst to a transmission wavelength selected from spare transmission wavelengths set aside for use during contentions between data bursts and not normally used for optical data bursts and control bursts;
means for dropping one or more data bursts based at least in part on relative priority or wavelength, or combinations thereof; and
means for scheduling transmission of said first data burst based upon said control information and results of said resolving.

25. The apparatus of claim 24, wherein said means for resolving includes means for changing a transmission wavelength for said first data burst.

26. The apparatus of claim 24, wherein said means for resolving includes means for inserting a time delay for said first data burst.

27. The apparatus of claim 24, wherein said means for resolving includes means for sending said first data burst to a core switching node.

28. The apparatus of claim 24, wherein said means for resolving includes means for requesting retransmission of said first data burst when said first data burst has a lower relative priority to said second data burst.

29. A system, comprising:
a parser to deframe an incoming control burst;
a photonic burst switch ("PBS");
a scheduler coupled to said parser to schedule a configuration of said PBS and a variable duration time division multiplexing channel to transmit a data burst corresponding to said incoming control burst, the variable duration time division multiplexing channel comprising a plurality of time slots, each time slot comprising a duration that can be different from at least one other time slot; and
a contention resolution block coupled to said scheduler to determine an alternate routing of said data burst when said scheduler determines a resource contention of said PBS; and
a PBS configuration and control module coupled to said scheduler and to said PBS to configure the PBS in response to said scheduler, the PBS configuration and control module further coupled to the contention resolution block to configure the PBS in response to the contention resolution block to route the data burst according to the alternate routing when the resource contention occurs.

30. The system of claim 29, wherein said contention resolution block is to set up a path on an alternate wavelength for said data burst.

31. The system of claim 30, comprising a tunable wavelength converter coupled to said photonic burst switch to supply said path.

32. The system of claim 29, wherein said contention resolution block is to set up a path with a time delay for said data burst.

33. The system of claim 32, comprising a variable time-delay optical buffer coupled to said photonic burst switch to supply said path.

34. The system of claim 32, comprising a core switching node coupled to said photonic burst switch to supply said path.

35. The system of claim 29, comprising an originating edge router, wherein said contention resolution block is to set up alternate routing by requesting a retransmission of said data burst from said originating edge router.

36. The system of claim 29, comprising a network management controller coupled to said parser to maintain a list of available variable duration time division multiplexing channels and wavelengths.

37. The system of claim 29, comprising a synchronizer to send a sync message to a remote core switching node.

* * * * *